US012683507B2

(12) United States Patent
Onuki

(10) Patent No.: US 12,683,507 B2
(45) Date of Patent: Jul. 14, 2026

(54) ALTERNATING CURRENT GENERATION CIRCUIT AND TEMPERATURE RAISING DEVICE

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 614 days.

(21) Appl. No.: 18/202,332

(22) Filed: May 26, 2023

(65) Prior Publication Data

US 2023/0387819 A1 Nov. 30, 2023

(30) Foreign Application Priority Data

May 30, 2022 (JP) ................................. 2022-087635

(51) Int. Cl.
*H02M 5/293* (2006.01)
*H01M 10/615* (2014.01)
(Continued)

(52) U.S. Cl.
CPC ......... *H02M 5/293* (2013.01); *H01M 10/615* (2015.04); *H01M 10/625* (2015.04);
(Continued)

(58) Field of Classification Search
CPC ...... H02M 5/293; H05B 1/0227; Y02E 60/10; H01M 10/615; H01M 10/625; H01M 10/657
See application file for complete search history.

(56) References Cited

U.S. PATENT DOCUMENTS 6,340,879 B1 1/2002 Blacker
12,074,305 B2* 8/2024 Onuki ................. H01M 10/615
(Continued)

FOREIGN PATENT DOCUMENTS

CN 106025443 10/2016
CN 110336099 10/2019
(Continued)

OTHER PUBLICATIONS

Japanese Notice of Allowance for Japanese Patent Application No. 2022-087635 mailed Oct. 28, 2025.
(Continued)

*Primary Examiner* — Andrew J Marien
(74) *Attorney, Agent, or Firm* — Amin, Turocy & Watson, LLP

(57) ABSTRACT
An alternating current (AC) generation circuit includes a first capacitor having a first end connected to a positive electrode side of a power storage having an inductance component, a second capacitor having a second end connected to a negative electrode side of the power storage, a parallel switch unit configured to connect the first capacitor and the second capacitor in parallel to the power storage, a series switch unit configured to connect the first capacitor and the second capacitor in series with the power storage, a first inductor connected between the positive electrode side of the power storage and the first end of the first capacitor, a second inductor connected between the second end of the second capacitor and the negative electrode side of the power storage, a third capacitor connected between the second end of the first capacitor and the negative electrode side of the power storage, and a fourth capacitor connected between the positive electrode side of the power storage and the first end of the second capacitor.

10 Claims, 11 Drawing Sheets

42

(51) Int. Cl.
H01M 10/625 (2014.01)
H01M 10/657 (2014.01)
H05B 1/02 (2006.01)

(52) U.S. Cl.
CPC ........ H01M 10/657 (2015.04); H05B 1/0227 (2013.01); Y02E 60/10 (2013.01)

(56) References Cited

U.S. PATENT DOCUMENTS

| | | | |
|---|---|---|---|
| 2021/0221254 A1* | 7/2021 | Abe ........................ | B60L 58/26 |
| 2022/0021045 A1 | 1/2022 | Onuki | |
| 2023/0064126 A1 | 3/2023 | Onuki | |
| 2023/0318089 A1 | 10/2023 | Onuki | |

FOREIGN PATENT DOCUMENTS

| | | |
|---|---|---|
| CN | 113948796 | 1/2022 |
| JP | 2000-228231 | 8/2000 |
| JP | 5293820 | 9/2013 |
| JP | 2022-019201 | 1/2022 |
| JP | 2023-035603 | 3/2023 |
| JP | 2023-146354 | 10/2023 |

OTHER PUBLICATIONS

Chinese Office Action for Chinese Patent Application No. 202310594570.7 mailed Jan. 28, 2026.

* cited by examiner (b)

(a)

1

ALTERNATING CURRENT GENERATION CIRCUIT AND TEMPERATURE RAISING DEVICE

CROSS-REFERENCE TO RELATED APPLICATION

Priority is claimed on Japanese Patent Application No. 2022-087635, filed May 2022, the content of which is incorporated herein by reference.

BACKGROUND OF THE INVENTION

Field of the Invention

The present invention relates to an alternating current (AC) generation circuit and a temperature raising device.

Description of Related Art

Efforts are underway to reduce adverse effects on the global environment (for example, reduction of $NO_x$ and $SO_x$ and reduction of $CO_2$). Thus, in recent years, from the viewpoint of improving the global environment, for reduction of $CO_2$, there is growing interest in at least electric vehicles allowed to travel with electric motors driven by power supplied by batteries (secondary batteries) such as, for example, a hybrid electric vehicle (HEV) and a plug-in hybrid electric vehicle (PHEV). The use of a lithium-ion secondary battery is being considered as a battery for in-vehicle use. In these electric vehicles, it is important to fully bring out the performance of the secondary battery. It is known that the charging/discharging performance of a secondary battery deteriorates when the temperature at the time of use drops below an appropriate range. It is possible to limit the deterioration of the charging/discharging performance of the secondary battery by raising the temperature to a suitable temperature at the time of use.

In relation to this, for example, Japanese Patent No. 5293820 discloses technology related to a temperature raising device for raising the temperature of a secondary battery. In the temperature raising device disclosed in Japanese Patent No. 5293820, the temperature of the secondary battery is raised by positively generating a ripple current of a prescribed frequency of a frequency range in which an absolute value of impedance is relatively decreased in the secondary battery on the basis of frequency characteristics of impedance of the secondary battery.

SUMMARY OF THE INVENTION

However, in the conventional technology, it may not be possible to raise the temperature of the secondary battery efficiently.

The present invention has been made on the basis of the above recognition of the problems and an objective of the present invention is to provide an AC generation circuit and a temperature raising device capable of improving energy efficiency by raising the temperature of a secondary battery more efficiently.

An AC generation circuit and a temperature raising device according to the present invention adopt the following configurations.

(1): According to an aspect of the present invention, there is provided an AC generation circuit for raising the temperature of a power storage by generating an AC current based on electric power stored in the power storage having an inductance component, the AC generation circuit including: a first capacitor having a first end connected to a positive electrode side of the power storage; a second capacitor having a second end connected to a negative electrode side of the power storage; a parallel switch unit configured to connect the first capacitor and the second capacitor in parallel to the power storage by connecting a second end of the first capacitor and the second end of the second capacitor and connecting the first end of the first capacitor and a first end of the second capacitor; a series switch unit configured to connect the first capacitor and the second capacitor in series with the power storage by connecting the second end of the first capacitor and the first end of the second capacitor; a first inductor connected between the positive electrode side of the power storage and the first end of the first capacitor; a second inductor connected between the second end of the second capacitor and the negative electrode side of the power storage; a third capacitor connected between the second end of the first capacitor and the negative electrode side of the power storage; and a fourth capacitor connected between the positive electrode side of the power storage and the first end of the second capacitor.

(2): In the above-described aspect (1), the inductance of the first inductor, the inductance of the second inductor, the capacitance of the first capacitor, the capacitance of the second capacitor, the capacitance of the third capacitor, and the capacitance of the fourth capacitor are adjusted so that an electric current waveform of the AC current is close to a waveform of a sinusoidal wave on the basis of a relational equation including the inductance component.

(3): In the above-described aspect (2), the relational equation is used to adjust inductance of the first inductor, inductance of the second inductor, capacitance of the first capacitor, capacitance of the second capacitor, capacitance of the third capacitor, and capacitance of the fourth capacitor so that a frequency of the AC current in a parallel state in which the first capacitor and the second capacitor are connected in parallel to the power storage matches a frequency of the AC current in a series state in which the first capacitor and the second capacitor are connected in series with the power storage.

(4): In the above-described aspect (3), the inductance of the first inductor is the same as the inductance of the second inductor.

(5): In the above-described aspect (4), the capacitance of the first capacitor and the capacitance of the second capacitor are the same as a first capacitance.

(6): In the above-described aspect (5), the capacitance of the third capacitor and the capacitance of the fourth capacitor are the same as a second capacitance.

(7): In the above-described aspect (1), the inductance component includes an inductance component provided in a wiring portion between the power storage and the AC generation circuit.

(8): In the above-described aspect (1), the parallel switch unit includes a first switch having a first terminal connected to the second end of the first capacitor and a second terminal connected to the second end of the second capacitor; and a second switch having a first terminal connected to the first end of the first capacitor and a second terminal connected to the first end of the second capacitor, wherein the series switch unit includes a third switch having a first terminal connected to the first end of the second capacitor and a second terminal connected to the second end of the first capacitor, wherein the first switch and the second switch are controlled so that the first switch and the second switch are in a conductive state or a non-conductive state at the same time according to a first control signal, wherein the third switch is controlled so that the first switch and the second switch are in the conductive state or the non-conductive state according to a second control signal, and wherein a period of a first state in which the first switch and the second switch are in the conductive state according to the first control signal does not overlap a period of a second state in which the third switch is in the conductive state according to the second control signal.

(9): In the above-described aspect (8), the power storage includes a first power storage and a second power storage connected in series with the first power storage, the AC generation circuit is connected to the first power storage, a second AC generation circuit having the same configuration as the AC generation circuit is connected to the second power storage, and the first control signal and the second control signal are input so that a prescribed phase difference is given between an AC current generated by the AC generation circuit and a second AC current that is an AC current generated by the second AC generation circuit.

(10): According to an aspect of the present invention, there is provided a temperature raising device including: the AC generation circuit according to the above-described aspect (9); and a controller configured to output the first control signal and the second control signal and alternately switch the state between a parallel state in which the first capacitor and the second capacitor are connected in parallel to the power storage by setting the first switch and the second switch in the conductive state and setting the third switch in the non-conductive state and a series state in which the first capacitor and the second capacitor are connected in series with the power storage by setting the first switch and the second switch in the non-conductive state and setting the third switch in the conductive state according to the first control signal and the second control signal.

According to the above-described aspects (1) to (10), it is possible to improve energy efficiency by raising the temperature of a secondary battery more efficiently.

DETAILED DESCRIPTION OF THE INVENTION

Hereinafter, embodiments of an AC generation circuit and a temperature raising device of the present invention will be described with reference to the drawings. As used throughout this disclosure, the singular forms "a," "an," and "the" include a plurality of references unless the context clearly dictates otherwise.

[Configuration of Vehicle]

Figure 1:
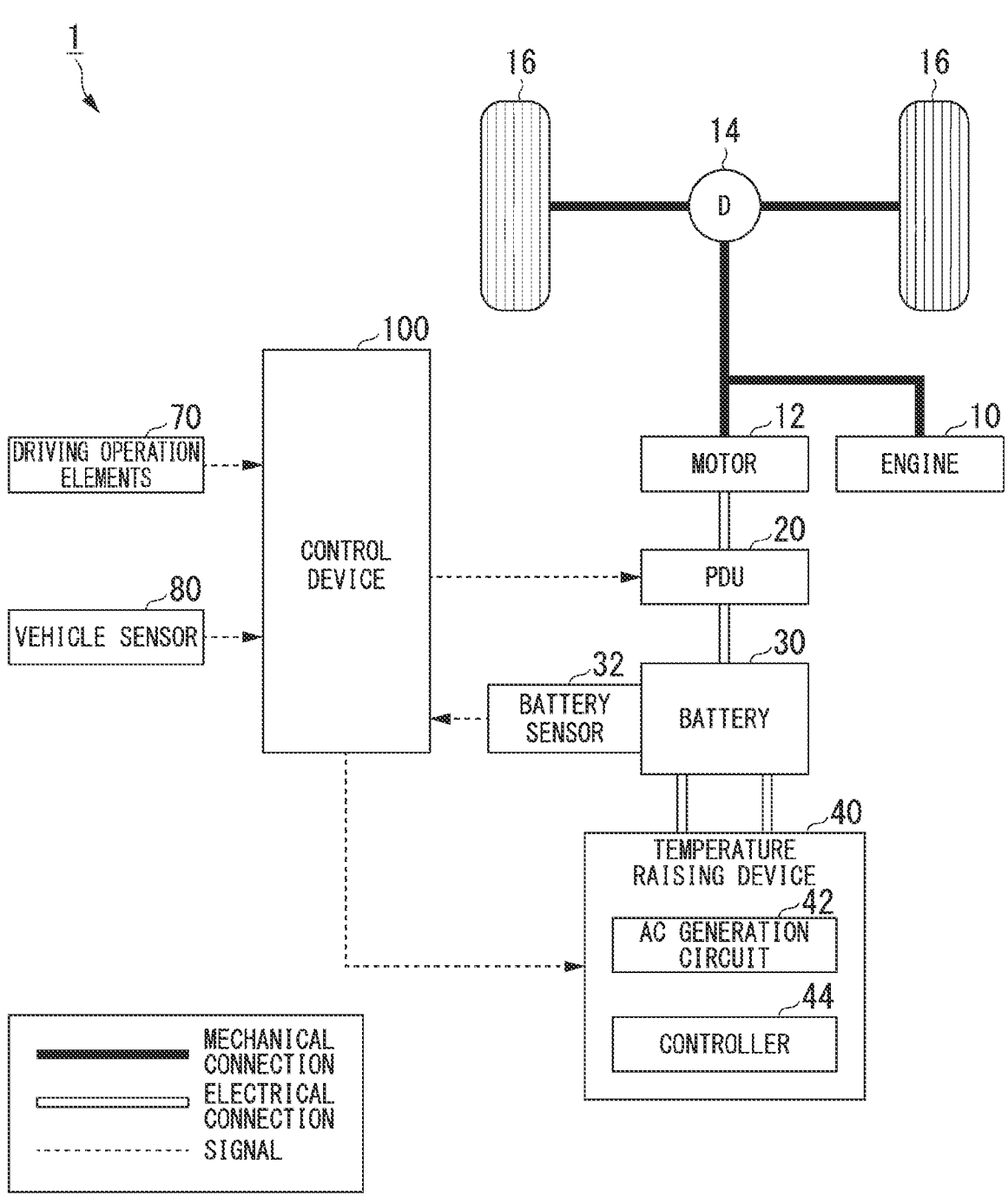
FIG. 1 is a diagram showing an example of a configuration of a vehicle in which a temperature raising device according to an embodiment is adopted.

FIG. 1 is a diagram showing an example of a configuration of a vehicle in which a temperature raising device according to an embodiment is adopted. A vehicle 1 is a hybrid electric vehicle (HEV) (hereinafter simply referred to as a "vehicle") that travels by combining driving of an electric motor driven using electric power supplied from a battery (a secondary battery) for traveling and driving of an internal combustion engine using fuel as an energy source, such as, for example, a diesel engine or a gasoline engine. Vehicles to which the present invention is applied may be, for example, general vehicles such as four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by power supplied from a battery for traveling such as an assisted bicycle. The vehicle 1 may be, for example, an electric vehicle (EV) that travels according to driving of only an electric motor.

The vehicle 1 includes, for example, an engine 10, a motor 12, a speed reducer 14, drive wheels 16, a power drive unit (PDU) 20, a battery 30, a battery sensor 32, a temperature raising device 40, driving operation elements 70, a vehicle sensor 80, and a control device 100.

The engine 10 is an internal combustion engine that outputs motive power by burning fuel, for example, such as light oil or gasoline, stored in a fuel tank (not shown) of the vehicle 1 and operating (rotating) the engine 10. The engine 10 is a reciprocating engine including, for example, a cylinder and a piston, an intake valve, an exhaust valve, a fuel injection device, an ignition plug, a conrod, a crankshaft, and the like. The engine may be a rotary engine. The rotational power of the engine 10 is transferred to the speed reducer 14.

The motor 12 is an electrical rotating machine for traveling of the vehicle 1. The motor 12 is, for example, a three-phase AC motor. The rotor of the motor 12 is connected to the speed reducer 14. The motor 12 is driven (rotated) by electric power supplied from the battery 30 via the PDU 20. The rotational power of the motor 12 is transferred to the speed reducer 14. The motor 12 may operate as a regenerative brake using kinetic energy of the vehicle 1 during deceleration to generate electric power. The motor 12 may include an electric motor for power generation. The electric motor for power generation uses, for example, the rotational power output by the engine 10 to generate electric power.

The speed reducer 14 is, for example, a differential gear. The speed reducer 14 allows a driving force of the shaft to which the engine 10 and the motor 12 are connected, i.e., the rotational power of the engine 10 and the motor 12, to be transferred to the axle to which the drive wheels 16 are connected. The speed reducer 14 may include, for example, a so-called transmission mechanism in which a plurality of gears or shafts are combined to change the rotational speed of the engine 10 or the motor 12 in accordance with a gear ratio and allow the rotational speed to be transferred to the axle. The speed reducer 14 may also include, for example, a clutch mechanism that directly connects or separates the rotational power of the engine 10 or the motor 12 to or from the axle.

The PDU 20 is, for example, an inverter, a direct current (DC)-DC converter, or an AC-DC converter. The PDU 20 converts the DC power supplied from the battery 30 into three-phase AC power for driving the motor 12 and outputs the AC power to the motor 12. The PDU 20 may include, for example, a voltage control unit (VCU) that boosts the DC power supplied from the battery 30. The PDU 20 converts the three-phase AC power generated by the motor 12 operating as a regenerative brake into DC power and outputs the DC power to the battery 30. The voltage of the PDU 20 may be boosted or lowered in accordance with the power output destination and the boosted or lowered voltage may be output. Although the components of the PDU 20 are shown as a single unitary configuration in FIG. 1, this is only an example and the components provided in the PDU 20 may be decentralized and arranged in the vehicle 1.

The battery 30 is a battery for traveling of the vehicle 1. The battery 30 is, for example, a battery including a secondary battery capable of iteratively being charged and discharged as a power storage unit such as a lithium-ion battery. The battery 30 may have a configuration that can be easily attached to and detached from the vehicle 1, such as a cassette type battery pack, or may have a stationary configuration that is not easily attached to and detached from the vehicle 1. The secondary battery provided in the battery 30 is, for example, a lithium-ion battery. Although, for example, a capacitor such as an electric double layer capacitor, a composite battery in which a secondary battery and a capacitor are combined, and the like as well as a lead storage battery, a nickel-hydrogen battery, a sodium ion battery, and the like can be considered for the secondary battery provided in the battery 30, the secondary battery may have any configuration. The battery 30 stores (is charged with) electric power introduced from an external charger (not shown) of the vehicle 1 and is discharged to supply the stored power such that the vehicle 1 is allowed to travel. The battery 30 stores (is charged with) the electric power generated by the motor 12 operated as a regenerative brake supplied via the PDU 20 and is discharged to supply the stored electric power for traveling (for example, accelerating) of the vehicle 1. The battery 30 has at least an inductance component.

The battery 30 is an example of a "power storage." An inductance component provided in the battery 30 (an inductance component connected to the power storage unit provided in the battery 30) is an example of an "inductance component."

A battery sensor 32 is connected to the battery 30. The battery sensor 32 detects physical quantities such as a voltage, a current, and a temperature of the battery 30. The battery sensor 32 includes, for example, a voltage sensor, a current sensor, and a temperature sensor. The battery sensor 32 detects the voltage of the battery 30 using the voltage sensor, detects the current of the battery 30 using the current sensor, and detects the temperature of the battery 30 using the temperature sensor. The battery sensor 32 outputs information such as a detected voltage value, current value, and temperature of the battery 30 (hereinafter referred to as "battery information") to the control device 100.

The temperature raising device 40 raises the temperature of the battery 30 in accordance with control from the control device 100. The temperature raising device 40 includes, for example, an AC generation circuit 42 and a controller 44.

The AC generation circuit 42 includes, for example, a capacitor connected to the positive electrode side of the battery 30, a capacitor connected to the negative electrode side of the battery 30, a series switch unit for connecting the capacitors in series with the battery 30, and a parallel switch unit for connecting the capacitors in parallel to the battery 30. The AC generation circuit 42 generates an AC current (ripple current) by a resonant operation between the inductance component provided in the battery 30 and a capacitor connected to at least the positive electrode side. More specifically, the AC generation circuit 42 generates an AC current based on electric power stored in the battery 30 according to a resonant operation for alternately switching the energy between magnetic energy stored in the inductance component of the battery 30 and electrostatic energy stored in the capacitor connected to at least the positive electrode side. The AC generation circuit 42 causes the temperature of the battery 30 to rise by applying the generated AC current to the battery 30 (or allowing the generated AC current to flow through the battery 30).

The controller 44 switches the connection of each capacitor to the battery 30 to one of the series connection or the parallel connection by causing each of the series switch unit and the parallel switch unit provided in the AC generation circuit 42 to be in a conductive state or a non-conductive state. More specifically, the controller 44 alternately switches the state between a state in which the capacitors are connected in series with the battery 30 by causing the series switch unit to be in the conductive state and causing the parallel switch unit to be in the non-conductive state and a state in which the capacitors are connected in parallel to the battery 30 by causing the series switch unit to be in the non-conductive state and causing the parallel switch unit to be in the conductive state. At this time, the controller 44 may switch the connection of each capacitor to the battery 30 from the series connection to the parallel connection or vice versa so that periods in which both the series switch unit and the parallel switch unit are in a conductive state do not overlap. In other words, the controller 44 provides a so-called dead time during which both the series switch unit and the parallel switch unit are in a non-conductive state and the connection of each capacitor to the battery 30 may be switched from the series connection to the parallel connection or vice versa.

The state in which each capacitor is connected in series with the battery 30 is an example of a "series state," and the state in which each capacitor is connected in parallel to the battery 30 is an example of a "parallel state." Details of the temperature raising device 40 and the components provided in the temperature raising device 40 will be described below.

The driving operation elements 70 include, for example, an accelerator pedal, a brake pedal, a shift lever, a steering wheel, a variant steering wheel, a joystick, and other operation elements. The driving operation element 70 is equipped with a sensor that detects the presence or absence of an operation of a user (a driver) of the vehicle 1 on each operation element or an amount of operation. The driving operation element 70 outputs a detection result of the sensor to the control device 100.

The vehicle sensor 80 detects a traveling state of the vehicle 1. The vehicle sensor 80 includes, for example, a vehicle speed sensor that detects the speed of the vehicle 1 and an acceleration sensor that detects the acceleration of the vehicle 1. The vehicle sensor 80 outputs a detection result detected by each sensor to the control device 100.

The control device 100 controls an operation of the engine 10 or the motor 12 in accordance with a detection result output by each sensor provided in the driving operation element 70, i.e., an operation of the user (the driver) of the vehicle 1 on each operation element. In other words, the control device 100 controls a driving force of the motor 12. The control device 100 may include, for example, separate control devices such as an engine control unit, a motor control unit, a battery control unit, a PDU control unit, and a VCU control unit. For example, the control device 100 may be replaced with a control device such as an engine electronic control unit (ECU), a motor ECU, a battery ECU, a PDU-ECU, or a VCU-ECU.

The control device 100 controls a supply amount of AC power supplied from the battery 30 to the motor 12 and a frequency (i.e., a voltage waveform) of the AC power to be supplied when the vehicle 1 travels. At this time, the control device 100 controls the activation of the temperature raising device 40 on the basis of information of a temperature of the battery 30 included in the battery information output by the battery sensor 32. That is, the control device 100 controls the activation or stopping of the temperature raising device 40 such that the temperature of the battery 30 is increased (raised) to a temperature suitable for use to limit the deterioration of the charging/discharging performance of the battery 30.

The control device 100 operates, for example, when a hardware processor such as a central processing unit (CPU) executes a program (software). The control device 100 may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The control device 100 may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in the drive device provided in the vehicle 1.

[Configuration of AC Generation Circuit Provided in Temperature Raising Device]

Figure 2:
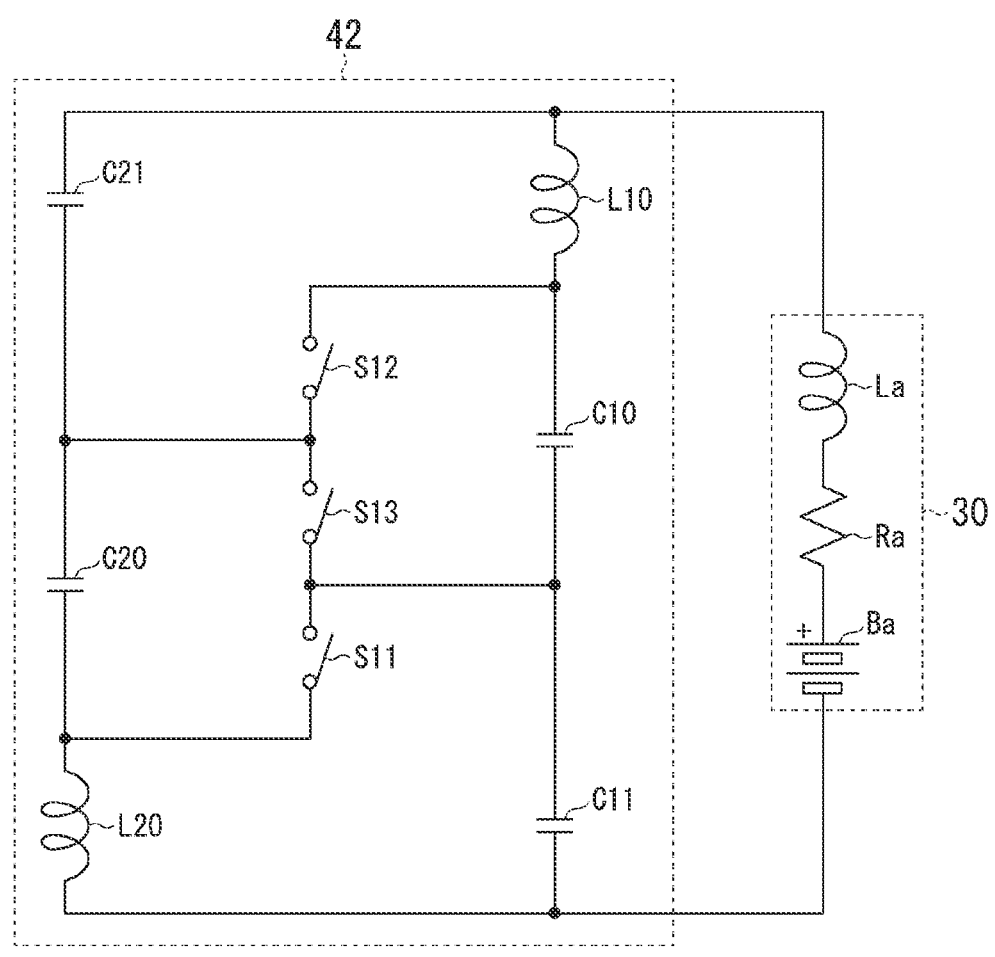
FIG. 2 is a diagram showing an example of a configuration of an AC generation circuit provided in the temperature raising device according to the embodiment.

FIG. 2 is a diagram showing an example of a configuration of the AC generation circuit 42 provided in the temperature raising device 40 according to the embodiment. In FIG. 2, the battery 30 associated with the AC generation circuit 42 is also shown. In the battery 30, for example, resistance Ra and inductance La are connected in series with a positive electrode side of a power storage unit Ba. The inductance La connected to the power storage unit Ba provided in the battery 30 is an example of an "inductance component."

The AC generation circuit 42 includes, for example, a capacitor C10, a capacitor C11, a capacitor C20, a capacitor C21, a switch S11, a switch S12, a switch S13, an inductor L10, and an inductor L20.

A first end of the capacitor C10 is connected to a positive electrode side of the battery 30 via the inductor L10. More specifically, the first end of the capacitor C10 is connected to a second end of the inductor L10 and a first end of the inductor L10 is connected to the positive electrode side of the battery 30. Furthermore, the first end of the capacitor C10 is connected to a first terminal of the switch S12. A second end of the capacitor C10 is connected to a first end of the capacitor C11. Furthermore, the second end of the capacitor C10 is connected to a first terminal of the switch S11 and a second terminal of the switch S13. A second end of the capacitor C11 is connected to a negative electrode side of the battery 30. A second end of the capacitor C20 is connected to a negative electrode side of the battery 30 via the inductor L20. More specifically, the second end of the capacitor C20 is connected to a first end of the inductor L20 and a second end of the inductor L20 is connected to the negative electrode side of the battery 30. That is, the second end of the capacitor C11 and the second end of the inductor L20 are connected to the negative electrode side of the battery 30. Furthermore, the second end of the capacitor C20 is connected to a second terminal of the switch S11. A first end of the capacitor C20 is connected to a second end of the capacitor C21. Furthermore, the first end of the capacitor C20 is connected to a second terminal of the switch S12 and a first terminal of the switch S13. A first end of the capacitor C21 is connected to the positive electrode side of the battery 30. That is, the first end of the inductor L10 and the first end of the capacitor C21 are connected to the positive electrode side of the battery 30.

Each of the capacitor C10 and the capacitor C20 is a capacitor whose connection is switched between a connection in series with the battery 30 (a series state) and a connection in parallel to the battery 30 (a parallel state). Each of the capacitor C10 and the capacitor C20 is a capacitor whose connection is switched between a connection in series with the battery 30 and a connection in parallel to the battery 30, so that an AC current (ripple current) is generated according to a resonant operation associated with the inductance component provided in the battery 30. The capacitor C10 and the capacitor C20 are capacitors having the same capacitance as each other. Each of the capacitor C11, the capacitor C21, the inductor L10, and the inductor L20 is a component for making an adjustment so that the total impedance of the AC generation circuit 42 is similar in a state in which each of the capacitor C10 and the capacitor C20 is connected in series with the battery 30 and a state in which each of the capacitor C10 and the capacitor C20 is connected in parallel to the battery 30. The capacitor C11 and the capacitor C21 are capacitors having the same capacitance as each other. The inductor L10 and the inductor L20 are inductors having the same inductance as each other.

Each of the switch S11, the switch S12, and the switch S13 is controlled to be in a conductive state in which a connection is established between both terminals thereof (a closed state) or a non-conductive state in which a connection is not established between both terminals thereof (an open state) in accordance with a control signal output by the controller 44. The controller 44 controls the switch S1 and the switch S12 as a parallel switch unit in which the capacitor C10 and the capacitor C20 are connected in parallel to the battery 30. The controller 44 controls the switch S13 as a series switch unit in which the capacitor C10 and the capacitor C20 are connected in series with the battery 30.

Each of the switch S11, the switch S12, and the switch S13 may be, for example, a semiconductor switching element that is controlled to be in an ON or OFF state such as an N-channel metal oxide semiconductor field effect transistor (MOSFET). In this case, for example, a configuration in which diodes functioning as flyback diodes are further connected in parallel may be adopted. When each of the switch S11, the switch S12, and the switch S13 is composed of a semiconductor switching element, the controller 44 outputs a gate signal for causing the semiconductor switching element to be in the ON state or the OFF state as a control signal for controlling each of the switch S11, the switch S12, and the switch S13 to be in the conductive state or the non-conductive state.

In the following description, the control signal for controlling the switch S11 to be in the conductive state or the non-conductive state output by the controller 44 is referred to as a "control signal CS11," a control signal for controlling the switch S12 to be in the conductive state or the non-conductive state is referred to as a "control signal CS12," and a control signal for controlling the switch S13 to be in the conductive state or the non-conductive state is referred to as a "control signal CS13." When the switch S11 and the switch S12 are simultaneously controlled as a parallel switch unit, the controller 44 may output the control signal CS11 and the control signal CS12 as the same control signal CS.

According to this configuration, in the AC generation circuit 42, the capacitor C10 and the capacitor C20 are connected in series or in parallel between the positive and negative electrode sides of the battery 30 in accordance with control from the controller 44. More specifically, the controller 44 causes the capacitor C10 and the capacitor C20 to be connected in series between the positive electrode side and the negative electrode side of the battery 30 by outputting the control signal CS11 for causing the switch S11 to be in the non-conductive state to the switch S11, outputting the control signal CS12 for causing the switch S12 to be in the non-conductive state to the switch S12, and outputting the control signal CS13 for causing the switch S13 to be in the conductive state to the switch S13. On the other hand, the controller 44 causes the capacitor C10 and the capacitor C20 to be connected in parallel between the positive electrode side and the negative electrode side of the battery 30 by outputting the control signal CS11 for causing the switch S11 to be in the conductive state to the switch S11, outputting the control signal CS12 for causing the switch S12 to be in the conductive state to the switch S12, and outputting the control signal CS13 for causing the switch S13 to be in the non-conductive state to the switch S13.

In the AC generation circuit 42, the capacitor C10 is an example of a "first capacitor," the capacitor C20 is an example of a "second capacitor," the capacitor C11 is an example of a "third capacitor," and the capacitor C21 is an example of a "fourth capacitor." In the AC generation circuit 42, the switch S11 is an example of a "first switch," the switch S12 is an example of a "second switch," and the switch S13 is an example of a "third switch." In the AC generation circuit 42, the inductor L10 is an example of a "first inductor," and the inductor L20 is an example of a "second inductor." The control signal CS11 output to the switch S11 by the controller 44 and the control signal CS12 output to the switch S12 thereby are examples of a "first control signal," and the control signal CS13 output to the switch S13 by the controller 44 is an example of a "second control signal." A state in which the controller 44 causes the switch S11 and the switch S12 to be in a conductive state according to the control signal CS11 and the control signal CS12 is an example of a "first state." A state in which the controller 44 causes the switch S13 to be in the conductive state according to the control signal CS13 is an example of a "second state." A state in which the controller 44 causes both the switch S11 and the switch S12 to be in the non-conductive state according to the control signal CS11 and the control signal CS12 and causes the switch S13 to be in the conductive state according to the control signal CS13 is an example of a "series state." A state in which the controller 44 causes both the switch S11 and the switch S12 to be in the conductive state according to the control signal CS11 and the control signal CS12 and causes the switch S13 to be in the non-conductive state according to the control signal CS13 is an example of a "parallel state."

[Operation of AC Generation Circuit]

Here, the frequency of the AC current generated by the AC generation circuit 42 is considered. It is preferable that the electric current waveform of the AC current generated by the AC generation circuit 42 be a waveform of a sinusoidal wave so that the temperature raising device 40 efficiently raises the temperature of the battery 30.

Meanwhile, as described above, in the AC generation circuit 42, the capacitor C10 and the capacitor C20 are capacitors having the same capacitance as each other. Thus, when the capacitor C10 and the capacitor C20 are connected in series with and in parallel to the battery 30 in the AC generation circuit 42, the total capacitance is different between the series connection and the parallel connection if the capacitor C10 and the capacitor C20 are considered to be one capacitor. More specifically, when the capacitor C10 and the capacitor C20 are connected in series, the total capacitance of the AC generation circuit 42 is a reciprocal of a sum of reciprocals of individual capacitances of the capacitors, i.e., half the capacitance. On the other hand, when the capacitor C10 and the capacitor C20 are connected in parallel, the total capacitance of the AC generation circuit 42 is a sum of individual capacitances of the capacitors, i.e., twice the capacitance. In other words, when the capacitor C10 and the capacitor C20 are connected in series with and in parallel to the battery 30, a difference between the total capacitances of the AC generation circuit 42 is increased by a factor of four. Thus, when the capacitor C10 and the capacitor C20 are connected in series with and in parallel to the battery 30 in the AC generation circuit 42, a difference between the frequencies of the generated AC current is increased by a factor of two.

Figure 3:
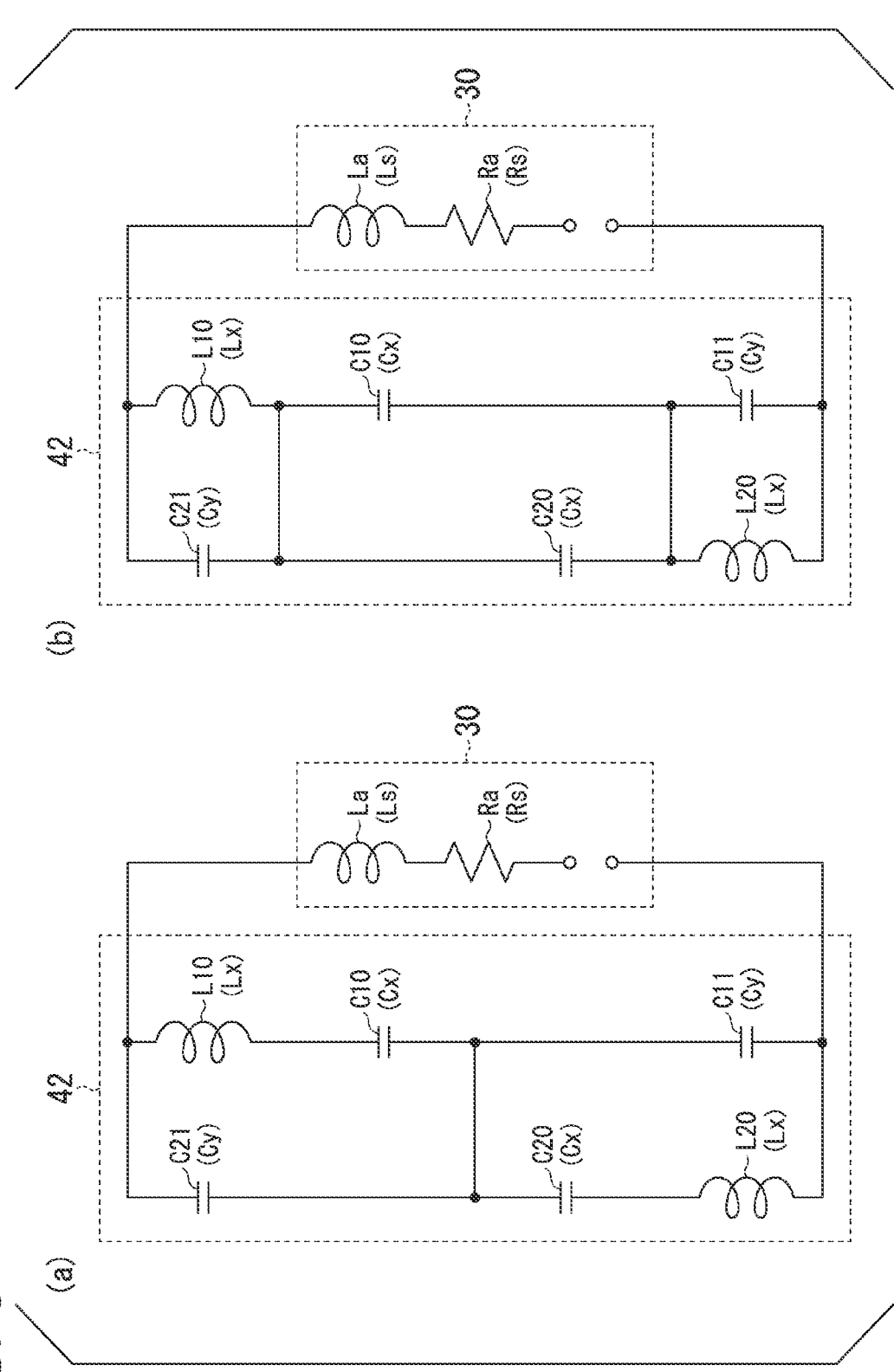
FIG. 3 is an example of an equivalent circuit of a series connection and a parallel connection in the AC generation circuit of the embodiment.

Here, a difference between the cases where the capacitor C10 and the capacitor C20 are connected in series with and in parallel to the battery 30 in the AC generation circuit 42 will be described. FIG. 3 is an example of equivalent circuits of a series connection and a parallel connection in the AC generation circuit 42 of the embodiment. An equivalent circuit of a case where the capacitor C10 and the capacitor C20 are connected in series to the battery 30 is shown in (a) of FIG. 3 and an equivalent circuit of a case where the capacitor C10 and the capacitor C20 are connected in parallel to the battery 30 is shown in (b) of FIG. 3. In (a) of FIG. 3 and (b) of FIG. 3, equivalent circuits of a case where the switch S11, the switch S12, and the switch S13 are simply set in a conductive state or a non-conductive state in the AC generation circuit 42 shown in FIG. 2 are shown. In (a) of FIG. 3 and (b) of FIG. 3, an inductance component of the inductance La of the battery 30 is denoted by "Ls" and a resistance component of the resistance Ra is denoted by "Rs." In (a) of FIG. 3 and (b) of FIG. 3, the capacitances of the capacitor C10 and the capacitor C20 are denoted by "Cx," the capacitances of the capacitor C11 and the capacitor C21 are denoted by "Cy," and the inductances of the inductor L10 and the inductor L20 are denoted by "Lx."

The capacitance Cx of each of the capacitor C10 and the capacitor C20 is an example of "first capacitance" and the capacitance Cy of each of the capacitor C11 and the capacitor C21 is an example of "second capacitance."

As shown in (a) of FIG. 3, when the capacitor C10 and the capacitor C20 are connected in series with the battery 30 in the AC generation circuit 42, the inductor L10 is inserted in series between the capacitor C10 and the positive electrode side of the battery 30, the capacitor C11 is inserted in series between the capacitor C10 and the negative electrode side of the battery 30, the inductor L20 is inserted in series between the capacitor C20 and the negative electrode side of the battery 30, and the capacitor C21 is inserted in series between the capacitor C20 and the positive electrode side of the battery 30. On the other hand, as shown in (b) of FIG. 3, when the capacitor C10 and the capacitor C20 are connected in parallel to the battery 30 in the AC generation circuit 42, a parallel circuit of the capacitor C21 and the inductor L10 is inserted in series between the capacitor C10 and the capacitor C20 and the positive electrode side of the battery 30 and a parallel circuit of the capacitor C11 and the inductor L20 is inserted in series between the capacitor C10 and the capacitor C20 and the negative electrode side of the battery 30. Thus, the AC generation circuit 42 can align the frequency of the AC current to be generated during each of the series connection and the parallel connection of the capacitor C10 and the capacitor C20 according to a difference between connections of the capacitor C11, the capacitor C21, the inductor L10, and the inductor L20 in the cases of the series connection and the parallel connection of the capacitor C10 and the capacitor C20. Furthermore, in the AC generation circuit 42, the electric current waveform of the AC current to be generated can be made closer to a waveform of a sinusoidal wave during each of the series connection and the parallel connection of the capacitor C10 and the capacitor C20.

Comparative Example

[Configuration of AC Generation Circuit of Comparative Example]

Figure 4:
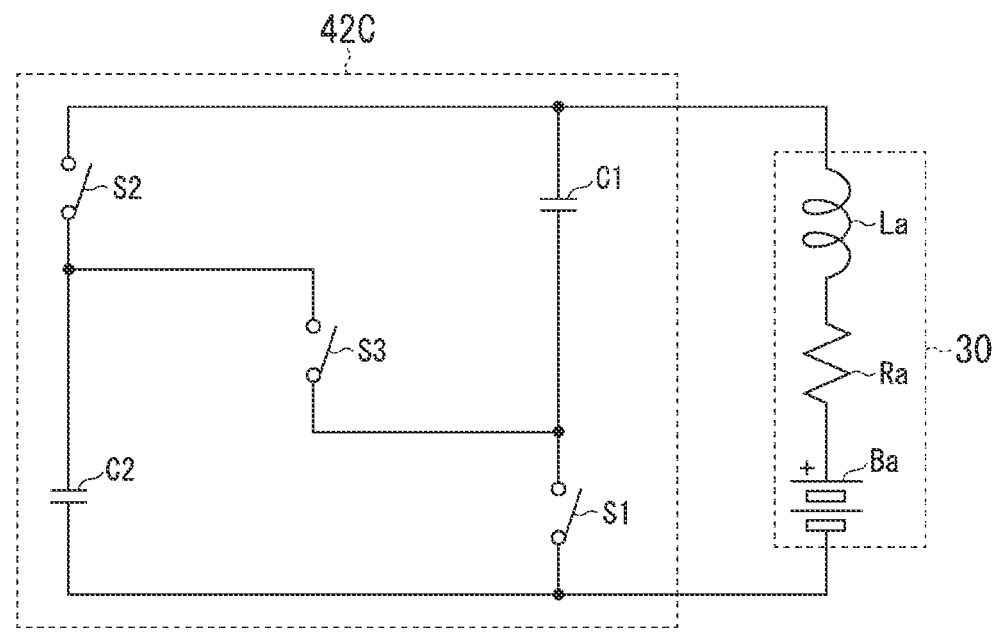
FIG. 4 is a diagram showing an example of a configuration of an AC generation circuit of a comparative example.

Here, an AC generation circuit of a comparative example in which the capacitor C11, the capacitor C21, the inductor L10, and the inductor L20 are not provided (hereinafter referred to as an "AC generation circuit 42C") will be first described to describe the effect in the configuration of the AC generation circuit 42. FIG. 4 is a diagram showing an example of a configuration of the AC generation circuit 42C of the comparative example.

The AC generation circuit 42C includes, for example, a capacitor C1, a capacitor C2, a switch S1, a switch S2, and a switch S3. The capacitor C1 and the capacitor C2 are capacitors having the same capacitance. Each of the switch S1, the switch S2, and the switch S3 is controlled to be in the conductive state or the non-conductive state between both terminals thereof, for example, in accordance with a control signal CS output by the controller 44. In the following description, a control signal for controlling the switch S1 to be in the conductive state or the non-conductive state output by the controller 44 is referred to as a "control signal CS1," and a control signal for controlling the switch S2 to be in the conductive state or the non-conductive state is referred to as a "control signal CS2," and a control signal for controlling the switch S3 to be in the conductive state or the non-conductive state is referred to as a "control signal CS3."

A first end of the capacitor C1 is connected to a positive electrode side of a battery 30. Furthermore, the first end of the capacitor C1 is connected to a first terminal of the switch S2. A second end of the capacitor C1 is connected to a first terminal of the switch S1 and a second terminal of the switch S3. A second end of the capacitor C2 is connected to a negative electrode side of the battery 30. Furthermore, the second end of the capacitor C2 is connected to a second terminal of the switch S1. A first end of the capacitor C2 is connected to a second terminal of the switch S2 and a first terminal of the switch S3.

In the AC generation circuit 42C, the capacitor C1 corresponds to the capacitor C10 provided in the AC generation circuit 42 and the capacitor C2 corresponds to the capacitor C20 provided in the AC generation circuit 42. In the AC generation circuit 42C, the switch S1 corresponds to the switch S11 provided in the AC generation circuit 42 and the switch S2 corresponds to the switch S12 provided in the AC generation circuit 42. In the AC generation circuit 42C, the switch S3 corresponds to the switch S13 provided in the AC generation circuit 42. Accordingly, the AC generation circuit 42C has a configuration in which the capacitor C11, the capacitor C21, the inductor L10, and the inductor L20 are omitted from the AC generation circuit 42.

Figure 5:
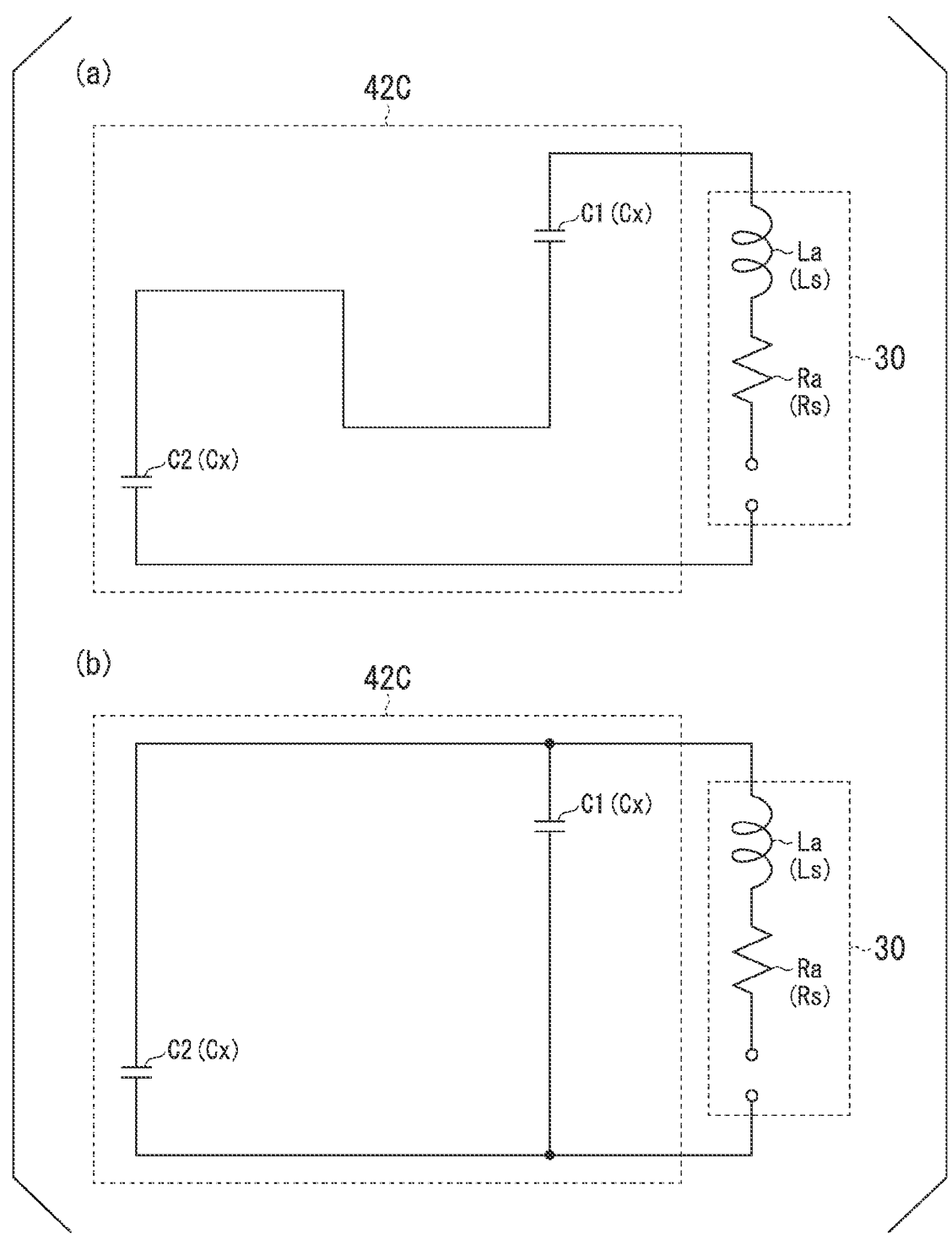
FIG. 5 is an example of an equivalent circuit of the AC generation circuit of the comparative example.

FIG. 5 is an example of an equivalent circuit of the AC generation circuit 42C of the comparative example. In (a) of FIG. 5, an equivalent circuit of a case where the capacitor C1 and the capacitor C2 are connected in series with the battery 30 in the AC generation circuit 42C is shown. In (b) of FIG. 5, an equivalent circuit of a case where the capacitor C1 and the capacitor C2 are connected in parallel to the battery 30 in the AC generation circuit 42C is shown. In FIG. 5, as in the equivalent circuit of the AC generation circuit 42 shown in (a) of FIG. 3 and (b) of FIG. 3, an inductance component of the inductance La of the battery 30 is denoted by "Ls" and a resistance component of the resistance Ra is denoted by "Rs." Also, capacitances of the capacitor C1 and the capacitor C2 are denoted by "Cx."

Here, a frequency of an AC current generated by the AC generation circuit 42C will be described with reference to FIG. 5. In the AC generation circuit 42C, impedance Z of a case where the capacitor C1 and the capacitor C2 are connected in series as shown in (a) of FIG. 5 can be obtained as shown in the following Eq. (1).

$$Z = ZLs + 2ZCx + Rs \qquad (1)$$

$$= j\omega Ls + \frac{2}{j\omega Cx} + Rs$$

$$= j\left(\omega Ls - \frac{2}{\omega Cx}\right) + Rs$$

Also, a resonant frequency ωs, which is an angular frequency of a case where the capacitor C1 and the capacitor C2 are connected in series in the AC generation circuit 42C, can be obtained as shown in the following Eq. (2).

$$\omega s = \sqrt{2} \cdot \frac{1}{\sqrt{Cx \cdot Ls}} \tag{2}$$

On the other hand, in the AC generation circuit 42C, as shown in (b) of FIG. 5, impedance Z of a case where the capacitor C1 and the capacitor C2 are connected in parallel can be obtained as shown in the following Eq. (3).

$$\begin{aligned} Z &= ZLs + \frac{ZCx}{2} + Rs \\ &= j\omega Ls + \frac{1}{2j\omega Cx} + Rs \\ &= \frac{1 - 2\omega^2 LsCx}{2j\omega Cx} + Rs \end{aligned} \tag{3}$$

Also, in the AC generation circuit 42C, a resonant frequency $\omega p$, which is an angular frequency of a case where the capacitor C1 and the capacitor C2 are connected in parallel, can be obtained as shown in the following Eq. (4).

$$\omega p = \frac{1}{\sqrt{2}} \cdot \frac{1}{\sqrt{Cx \cdot Ls}} \tag{4}$$

In the AC generation circuit 42C, when the resonant frequency $\omega s$ of the case where the capacitor C1 and the capacitor C2 are connected in series and the resonant frequency $\omega p$ of the case where the capacitor C1 and the capacitor C2 are connected in parallel are compared, a ratio expressed by the following Eq. (5) is given.

$$\omega s : \omega p = 2 : 1 \tag{5}$$

That is, in the AC generation circuit 42C, the resonant frequency to differs according to a total capacitance difference between the cases where the capacitor C1 and the capacitor C2 are connected in series and in parallel. More specifically, the resonant frequency $\omega s$ of the case where the capacitor C1 and the capacitor C2 are connected in series is twice the resonant frequency $\omega p$ of the case where the capacitor C1 and the capacitor C2 are connected in parallel. Thus, in the AC generation circuit 42C, the electric current waveform of the AC current to be generated does not become a waveform of a sinusoidal wave and the electric current waveform becomes asymmetric when the AC current has a positive (+) current value and when the AC current has a negative (−) current value. Thus, in the AC generation circuit 42C, a large harmonic component is included in the generated AC current and a large amount of noise is emitted when the temperature of the battery 30 is raised.

Thus, the AC generation circuit 42C reduces the efficiency when the temperature of the battery 30 is raised, for example, in a case where a configuration in which a plurality of batteries 30 are combined is adopted for the battery 30 mounted in the vehicle 1. For example, if a configuration in which two batteries 30 are combined for the battery 30 is adopted, it is conceivable to reduce the total voltage fluctuation (so-called voltage waveform ripple) when the temperature of the battery 30 is raised by connecting AC generation circuits 42C to the batteries 30 and providing a prescribed phase difference between electric current waveforms of the AC currents generated by the AC generation circuits 42C. That is, it is conceivable to reduce the total voltage fluctuation when the temperature of the battery 30 is raised by shifting the phase of the electric current waveform of the AC current generated by each AC generation circuit 42C by a prescribed phase between the AC generation circuits 42C. However, in the AC generation circuit 42C, it is difficult to sufficiently reduce the total voltage fluctuation because the electric current waveform of the AC current is asymmetric on the positive and negative sides. Thus, it is difficult to efficiently raise the temperature of the battery in the temperature raising device adopting the AC generation circuit 42C (hereinafter referred to as a "temperature raising device 40C").

The frequency of the AC current generated by the AC generation circuit 42 will be described with reference back to FIG. 3. First, the resonant frequency $\omega s$, which is an angular frequency of the case where the capacitor C10 and the capacitor C20 are connected in series, shown in (a) of FIG. 3 is taken into account.

Impedance Zs of the case where the capacitor C10 and the capacitor C20 are connected in series in the AC generation circuit 42 can be obtained from the equivalent circuit shown in (a) of FIG. 3 as shown in the following Eq. (6).

$$Zs = \frac{2}{\dfrac{1}{ZCy} + \dfrac{1}{ZCx + ZLx}} + ZLs + ZRs \tag{6}$$

On the basis of the above Eq. (6), the impedance Zs of the case where the capacitor C10 and the capacitor C20 are connected in series in the AC generation circuit 42 can be expressed as in the following Eq. (7).

$$\begin{aligned} Zs &= \frac{2}{\dfrac{1}{ZCy} + \dfrac{1}{ZCx + ZLx}} + ZLs + ZRs \\[2mm] &= \frac{2}{j\omega Cy + \dfrac{1}{\dfrac{1}{j\omega Cx} + j\omega Lx}} \\[2mm] &= \frac{2}{j\omega Cy + \dfrac{j\omega Cx}{1 - \omega^2 LxCx}} + j\omega Ls + Rs \\[2mm] &= \frac{2(1 - \omega^2 LxCx)}{j\omega Cy(1 - \omega^2 LxCx) + j\omega Cx} + j\omega Ls\frac{j\omega Cy(1 - \omega^2 LxCx) + j\omega Cx}{j\omega Cy(1 - \omega^2 LxCx) + j\omega Cx} + Rs \\[2mm] &= \frac{2(1 - \omega^2 LxCx)}{j\omega Cy(1 - \omega^2 LxCx) + j\omega Cx} - \omega^2 Ls\frac{Cy(1 - \omega^2 LxCx) + Cx}{j\omega Cy(1 - \omega^2 LxCx) + j\omega Cx} + Rs \\[2mm] &= \frac{2(1 - \omega^2 LxCx) - \omega^2 Ls(Cy(1 - \omega^2 LxCx) + Cx)}{j\omega Cy(1 - \omega^2 LxCx) + j\omega Cx} + Rs \\[2mm] &= \frac{\omega^4 LsLxCxCy - 2\omega^2 LxCx - \omega^2 Ls(Cy + Cx) + 2}{j\omega Cy(1 - \omega^2 LxCx) + j\omega Cx} + Rs \\[2mm] &= \frac{\omega^4 LsLxCxCy - \omega^2(2LxCx + Ls(Cy + Cx)) + 2}{j\omega Cy(1 - \omega^2 LxCx) + j\omega Cx} + Rs \end{aligned} \tag{7}$$

That is, the impedance Zs can be obtained as shown in the following Eq. (8).

$$Zs = \frac{\omega^4 LsLxCxCy - \omega^2(2LxCx + Ls(Cy + Cx)) + 2}{j\omega Cy(1 - \omega^2 LxCx) + j\omega Cx} + Rs \qquad (8)$$

Thus, a resonance point of the AC current generated when the capacitor C10 and the capacitor C20 are connected in series in the AC generation circuit 42 is a point where a condition in which the first term on the right side of the above Eq. (8) is zero is satisfied. That is, a point where the impedance Zs and the resistance component Rs of the resistance Ra provided in the battery 30 are equal (the following Eq. (9)) is a resonance point of an AC current to be generated when the capacitor C10 and the capacitor C20 are connected in series in the AC generation circuit 42.

$$Zs = Rs \qquad (9)$$

Accordingly, in order to satisfy the above Eq. (9), under the condition that the denominator of the first term of the right side of the above Eq. (8) is not zero, it is only necessary for the numerator of the first term of the right side of the above Eq. (8) to be zero as expressed by the following Eq. (10).

$$\omega^4 LsLxCxCy - \omega^2(2LxCx + Ls(Cy + Cx)) + 2 = 0 \qquad (10)$$

Consequently, when the capacitor C10 and the capacitor C20 are connected in series in the AC generation circuit 42, the resonant frequency ωs that satisfies the above Eq. (9) can be expressed by the following Eq. (11).

$$\omega s^2 = \frac{(2LxCx + LsCy + LsCx) \pm \sqrt{(2LxCx + LsCy + LsCx)^2 - 8LsLxCxCy}}{2LsLxCxCy} \qquad (11)$$

Here, each of the inductances Lx of the inductor L10 and the inductor L20 included in the above Eq. (11) is replaced with a ratio associated with the inductance component Ls of the inductance La provided in the battery 30 and each of the capacitances Cx of the capacitor C10 and the capacitor C20 is replaced with a ratio associated with the capacitances Cy of the capacitor C11 and the capacitor C21. That is, as shown in the following Eqs. (12), the inductance Lx is replaced with the inductance component Ls multiplied by a coefficient a and the capacitance Cx is replaced with the capacitance Cy multiplied by a coefficient b. Thereby, the above Eq. (11) is expressed as in the following Eq. (13).

$$Lx = aLs$$
$$Cx = bCy \qquad (12)$$

$$\omega s^2 = \frac{(2abLsCy + LsCy + bLsCy) \pm \sqrt{(2abLsCy + LsCy + bLsCy)^2 - 8abLs^2Cy^2}}{2abLs^2Cy^2}$$
$$= \frac{(2ab + 1 + b) \pm \sqrt{(2ab + 1 + b)^2 - 8ab}}{2abLsCy} \qquad (13)$$

The solution of the quadratic equation expressed by the above Eq. (13) is the resonant frequency ωs when the capacitor C10 and the capacitor C20 are connected in series in the AC generation circuit 42.

Next, a resonant frequency ωp, which is an angular frequency of the case where the capacitor C10 and the capacitor C20 are connected in parallel, shown in (b) of FIG. 3 is taken into account.

Impedance Zp of the case where the capacitor C10 and the capacitor C20 are connected in parallel in the AC generation circuit 42 can be obtained from the equivalent circuit shown in (b) of FIG. 3 as shown in the following Eq. (14).

$$Zp = \frac{2}{\dfrac{1}{ZCy} + \dfrac{1}{ZLx}} + \frac{ZCx}{2} + ZLs + ZRs \qquad (14)$$

On the basis of the above Eq. (14), the impedance Zp of the case where the capacitor C10 and the capacitor C20 are connected in parallel in the AC generation circuit 42 can be expressed as in the following Eq. (15).

$$\begin{aligned}
Zs &= \frac{2}{\dfrac{1}{ZCy} + \dfrac{1}{ZCx + ZLx}} + ZLs + ZRs \qquad (7)\\[6pt]
&= \frac{2}{j\omega Cy + \dfrac{1}{\dfrac{1}{j\omega Lx} + j\omega Cx}} + j\omega Ls\\[6pt]
&= \frac{2j\omega Lx}{1 - \omega^2 CyLx} + \frac{1}{2j\omega Cx} + j\omega Ls + Rs\\[6pt]
&= \frac{-4\omega^2 LxCx + (1 - \omega^2 CyLx)}{2j\omega Cx(1 - \omega^2 CyLx)} + j\omega Ls + Rs\\[6pt]
&= \frac{-4\omega^2 LxCx + (1 - \omega^2 CyLx)}{2j\omega Cx(1 - \omega^2 CyLx)} + j\omega Ls\frac{2j\omega Cx(1 - \omega^2 CyLx)}{2j\omega Cx(1 - \omega^2 CyLx)} + Rs\\[6pt]
&= \frac{-4\omega^2 LxCx + (1 - \omega^2 CyLx) - 2\omega^2 LsCx(1 - \omega^2 CyLx)}{2j\omega Cx(1 - \omega^2 CyLx)} + Rs\\[6pt]
&= \frac{2\omega^2 LsCxCyLx - \omega^2(4LxCx + CyLx + 2LsCx) + 1}{2j\omega Cx(1 - \omega^2 CyLx)} + Rs
\end{aligned}$$

That is, the impedance Zp can be obtained as shown in the following Eq. (16).

$$Zp = \frac{2\omega^2 LsCxCyLx - \omega^2(4LxCx + CyLx + 2LsCx) + 1}{2j\omega Cx(1 - \omega^2 CyLx)} + Rs \qquad (16)$$

Thus, the resonance point of the AC current generated when the capacitor C10 and the capacitor C20 are connected in parallel in the AC generation circuit 42 becomes a point where a condition in which a part of the first term on the right side of the above Eq. (16) is zero is satisfied according to a concept similar to that of the case where the capacitor C10 and the capacitor C20 are connected in series. That is, a point where the impedance Zp is the same as the resistance component Rs of the resistance Ra provided in the battery 30 (the following Eq. (17)) is the resonance point of the AC current to be generated when the capacitor C10 and the capacitor C20 are connected in parallel in the AC generation circuit 42.

$$Zp = Rs \tag{17}$$

Accordingly, in order to satisfy the above Eq. (17), under the condition that the denominator of the first term of the right side of the above Eq. (16) is not zero, it is only necessary for the numerator of the first term of the right side of the above Eq. (16) to be zero as expressed by the following Eq. (18).

$$2\omega^2 LsCxCyLx - \omega^2(4LxCx + CyLx + 2LsCx) + 1 = 0 \tag{18}$$

Consequently, when the capacitor C10 and the capacitor C20 are connected in parallel in the AC generation circuit 42, the resonant frequency ωp that satisfies the above Eq. (17) can be expressed by the following Eq. (19).

$$\omega p^2 = \frac{(4LxCx + LxCy + 2LsCx) \pm \sqrt{(4LxCx + LxCy + 2LsCx)^2 - 8LsLxCxCy}}{(4LsLxCxCy)} \tag{19}$$

Here, as in the case where the capacitor C10 and the capacitor C20 are connected in series, the above Eq. (19) is expressed as in the following Eq. (20) when the inductance Lx and the capacitance Cx included in the above Eq. (19) are replaced as in the above Eqs. (12).

$$\omega p^2 = \frac{(4abLsCy + aLsCy + 2bLsCy) \pm \sqrt{(4abLsCy + aLsCy + 2bLsCy)^2 - 8abLs^2Cy^2}}{4abLs^2Cy^2} \tag{20}$$
$$= \frac{(4ab + a + 2b) \pm \sqrt{(4ab + a + 2b)^2 - 8ab}}{4abLsCy}$$

The solution of the quadratic equation expressed by the above Eq. (20) is the resonant frequency ωp when the capacitor C10 and the capacitor C20 are connected in parallel in the AC generation circuit 42.

From this, in the AC generation circuit 42, it is only necessary to cause the following Eq. (22) to be valid on the basis of the above Eq. (13) and the above Eq. (20) so that the resonant frequency ωs of the case where the capacitor C10 and the capacitor C20 are connected in series is the same as the resonant frequency ωp of the case where the capacitor C10 and the capacitor C20 are connected in parallel (the following Eq. (21)).

$$\omega s^2 = \omega p^2 \tag{21}$$

$$\frac{(2ab + 1 + b) \pm \sqrt{(2ab + 1 + b)^2 - 8ab}}{2abLsCy} = \frac{(4ab + a + 2b) \pm \sqrt{(4ab + a + 2b)^2 - 8ab}}{4abLsCy} \tag{22}$$

Here, the above Eq. (22) is rewritten as in the following Eqs. (23) when the above Eq. (22) is calculated and is rewritten as in the following Eqs. (24) when it is further calculated.

$$(2ab + 1 + b) \pm 2\sqrt{(2ab + 1 + b)^2 - 8ab} = \tag{23}$$
$$(4ab + a + 2b) \pm \sqrt{(4ab + a + 2b)^2 - 8ab}$$
$$2 \pm 2\sqrt{(2ab + 1 + b)^2 - 8ab} = a \pm \sqrt{(4ab + a + 2b)^2 - 8ab}$$

$$2 - a \pm 2\sqrt{4a^2b^2 + 1 + b^2 + 4ab^2 + 2b - 4ab} = \tag{24}$$
$$\pm \sqrt{16a^2b^2 + a^2 + 4b^2 + 8a^2b + 16ab^2 - 4ab}$$

$$\left(2 - a \pm 2\sqrt{4a^2b^2 + 1 + b^2 + 4ab^2 + 2b - 4ab}\right)^2 =$$
$$16a^2b^2 + a^2 + 4b^2 + 8a^2b + 16ab^2 - 4ab$$

$$(2 - a)^2 \pm 4(2 - a)\sqrt{4a^2b^2 + 1 + b^2 + 4ab^2 + 2b - 4ab} +$$
$$4\left(4a^2b^2 + 1 + b^2 + 4ab^2 + 2b - 4ab\right) =$$
$$16a^2b^2 + a^2 + 4b^2 + 8a^2b + 16ab^2 - 4ab$$

$$(2 - a)^2 \pm 4(2 - a)\sqrt{4a^2b^2 + 1 + b^2 + 4ab^2 + 2b - 4ab} +$$
$$\left(16a^2b^2 + 4 + 4b^2 + 16ab^2 + 8b - 16ab\right) =$$
$$16a^2b^2 + a^2 + 4b^2 + 8a^2b + 16ab^2 - 4ab$$

$$\left(4 - 4a + a^2\right) \pm 4(2 - a)\sqrt{4a^2b^2 + 1 + b^2 + 4ab^2 + 2b - 4ab} +$$
$$(4 + 8b - 16ab) = a^2 + 8a^2b - 4ab$$

$$\pm 4(2 - a)\sqrt{4a^2b^2 + 1 + b^2 + 4ab^2 + 2b - 4ab} + \left(8 - 4a + a^2 + 8b - 16ab\right) =$$
$$a^2 + 8a^2b - 4ab$$

$$\pm 4(2 - a)\sqrt{4a^2b^2 + 1 + b^2 + 4ab^2 + 2b - 4ab} = 8a^2b + 12ab + 4a - 8b - 8$$

Also, the relational equation of the following Eq. (25) can be obtained from the above Eq. (24).

$$\pm (2 - a)\sqrt{4a^2b^2 + 1 + b^2 + 4ab^2 + 2b - 4ab} = 2a^2b + 3ab + a - 2b - 2 \tag{25}$$

If the above Eq. (25) is valid, the above Eq. (21) is valid in the AC generation circuit 42, i.e., the resonant frequency ωs of the case where the capacitor C10 and the capacitor C20 are connected in series and the resonant frequency nip of the case where the capacitor C10 and the capacitor C20 connected in parallel are equal (match).

Here, when the above Eq. (25) is further expanded, the square of the left side of the above Eq. (25) becomes the following Eq. (26) and the square of the right side of the above Eq. (25) becomes the following Eq. (27).

$$\left(4a^2b^2 + 1 + b^2 + 4ab^2 + 2b - 4ab\right) = \tag{26}$$
$$\left(4 - 4a + a^2\right)\left(4a^2b^2 + 1 + b^2 + 4ab^2 + 2b - 4ab\right) =$$
$$\left\{ \begin{array}{l} 16a^2b^2 + 4 + 4b^2 + 16ab^2 + 8b - 16ab \\ -16a^3b^2 - 4a - 4ab^2 - 16a^2b^2 - 8ab + 16a^2b \\ 4a^4b^2 + a^2 + a^2b^2 + 4a^3b^2 + 2a^2b - 4a^3b \end{array} \right\} =$$
$$\left\{ \begin{array}{l} 16a^2b^2 - 16a^2b^2 + a^2b^2 + 16ab^2 - 4ab^2 \\ -16ab - 8ab + 16a^2b + 2a^2b - 16a^3b^2 + 4a^3b^2 \\ +4a^4b^2 - 4a^3b + a^2 + 4b^2 - 4a + 8b + 4 \end{array} \right\} =$$

-continued $$\begin{cases} a^2b^2 + 12ab^2 \\ -24ab + 18a^2b - 12a^3b^2 \\ +4a^4b^2 - 4a^3b + a^2 + 4b^2 - 4a + 8b + 4 \end{cases} \tag{27}$$

$$(2a^2b + 3ab + a - 2b - 2)^2 =$$

$$\begin{cases} 4a^4b^2 + 6a^3b^2 + 2a^3b - 4a^2b^2 - 4a^2b \\ +6a^3b^2 + 9a^2b^2 + 3a^2b - 6ab^2 - 6ab \\ +2a^3b + 3a^2b + a^2 - 2ab - 2a \\ -4a^2b^2 - 6ab^2 - 2ab + 4b^2 + 4b \\ -4a^2b - 6ab - 2a + 4b + 4 \end{cases} =$$

$$\begin{cases} 4a^4b^2 + 6a^3b^2 + 6a^3b^2 \\ +2a^3b + 2a^3b \\ -4a^2b^2 + 9a^2b^2 - 4a^2b^2 \\ -4a^2b + 3a^2b + 3a^2b - 4a^2b \\ -6ab^2 - 6ab^2 \\ -6ab - 2ab - 2ab - 6ab \\ +a^2 + 4b^2 - 2a - 2a + 4b + 4b + 4 \end{cases} = \begin{cases} 4a^4b^2 + 12a^3b^2 + 4a^3b \\ +a^2b^2 - 2a^2b - 12ab^2 \\ -16ab + a^2 + 4b^2 \\ -4a + 8b + 4 \end{cases}$$

Also, when a relationship between the coefficient a and the coefficient b in a case where the squares of both sides in the above Eq. (25) (the above Eq. (26) and the above Eq. (27)) are equal is obtained as in the following Eqs. (28), the relational equation like the following Eq. (29) can be obtained.

$$\begin{cases} a^2b^2 = 12ab^2 \\ -24ab + 18a^2b - 12a^3b^2 \\ +4a^4b^2 - 4a^3b + a^2 + 4b^2 - 4a + 8b + 4 \end{cases} = \tag{28}$$

$$\begin{cases} 4a^2b^2 + 12a^3b^2 + 4a^3b \\ +a^2b^2 - 2a^2b - 12ab^2 \\ -16ab + a^2 + 4b^2 \\ -4a + 8b + 4 \end{cases}$$

$$\begin{cases} +24a^3b^2 + 8a^3b \\ -20a^2b - 24ab^2 \\ +8ab \end{cases} = 0$$

$$24a^2b + 8a^2 - 20a - 24b + 8 = 0$$

$$6a^2b + 2a^2 - 5a - 6b + 2 = 0$$

$$(6b + 2)a^2 - 5a - (6b - 2) = 0$$

$$a = \frac{5 \pm \sqrt{25 + 4(6b + 2)(6b - 2)}}{2(6b + 2)} \tag{29}$$

$$= \frac{5 \pm \sqrt{144b^2 + 9}}{4(3b + 1)}$$

$$= \frac{5 \pm 3\sqrt{16b^2 + 1}}{4(3b + 1)}$$

In the above Eq. (29), because there are "+(positive)" and "−(negative)" values in the numerator on the right side, it is possible to separately take into account two types of a relational equation (the following Eq. (30)) between a coefficient $a_1$ and a coefficient $b_1$ in the case where the numerator on the right side is "+(positive)" and a relational equation (the following Eq. (31)) between a coefficient $a_2$ and a coefficient $b_2$ in the case where the numerator on the right side is "−(negative)."

$$a_1 = \frac{5 + 3\sqrt{16b_1^2 + 1}}{4(3b_1 + 1)} \tag{30}$$

$$a_2 = \frac{5 - 3\sqrt{16b_2^2 + 1}}{4(3b_2 + 1)} \tag{31}$$

As a relationship between the coefficient a and the coefficient b, if a relationship of either the above Eq. (30) or the above Eq. (31) is valid, the resonant frequency ωs of the case where the capacitor C10 and the capacitor C20 are connected in series and the resonant frequency ωp of the case where the capacitor C10 and the capacitor C20 are connected in parallel in the AC generation circuit 42 are equal (or the following Eq. (32) is obtained).

$$\omega s = \omega p \tag{32}$$

However, a value of the coefficient $a_1$ is necessarily a positive value in the relational equation of the above Eq. (30), but a value of the coefficient $a_2$ may be a negative value in the relational equation of the above Eq. (31). When the value of the coefficient $a_2$ is the negative value, the operation of the AC generation circuit 42 is not valid. Thus, it is necessary to ensure that the numerator on the right side of the above Eq. (31) is a positive value so that the coefficient $a_2$ is a positive value (the following Inequality (33)). That is, in a range in which the coefficient $b_2$ can be taken in the relational equation of the above Eq. (31), specific conditions as determined in the ranges expressed by the following Inequalities (34) are required. However, even if the relational equation of the above Eq. (31) is not valid in the relationship between the coefficient a and the coefficient b, if the relational equation of the above Eq. (30) is valid, the resonant frequency ωs of the case where the capacitor C10 and the capacitor C20 are connected in series and the resonant frequency ωp of the case where the capacitor C10 and the capacitor C20 are connected in parallel in the AC generation circuit 42 match in at least one type (or the above Eq. (32) is obtained).

$$a_2 > 0 \tag{33}$$

$$5 - 3\sqrt{16b_2^2 + 1} > 0 \tag{34}$$

$$\frac{5}{3} > \sqrt{16b_2^2 + 1}$$

$$\frac{25}{9} - 1 > 16b_2^2$$

$$\frac{1}{3} > b_2$$

Taking this into account, it is possible to separately obtain the solution of the quadratic equation expressed by the above Eq. (13), i.e., the resonant frequency ωs of the case where the capacitor C10 and the capacitor C20 are connected in series in the AC generation circuit 42, in two types of a resonant frequency ωs1 of a case where the numerator on the right side is "+(positive)" and a resonant frequency ωs2 of a case where the numerator on the right side is "− (negative)" as in the following Eqs. (35).

$$\omega s^2 = \frac{(2ab + 1 + b) \pm \sqrt{(2ab + 1 + b)^2 - 8ab}}{2abLsCy} \tag{35}$$

$$\omega s1^2 = \frac{(2ab + 1 + b) + \sqrt{(2ab + 1 + b)^2 - 8ab}}{2abLsCy}$$

$$\omega s2^2 = \frac{(2ab + 1 + b) - \sqrt{(2ab + 1 + b)^2 - 8ab}}{2abLsCy}$$

Also, in this case, the resonant frequency $\omega s1$ is necessarily present, but the resonant frequency $\omega s2$ is present when the numerator on the right side included in the above Eqs. (35) becomes the following Inequalities (38) if a relationship between the coefficient a and the coefficient b is a relationship of the following Inequality (36) and the following Inequality (37) in the numerator of the right side included in the above Eqs. (35) is valid. That is, if the following Inequalities (38) are valid in the numerator of the right side of the above Eqs. (35), the following Inequality (39) is obtained and the resonant frequency $\omega s$ of the case where the capacitor C10 and the capacitor C20 are connected in series in the AC generation circuit 42 is present in two types of the resonant frequency $\omega s1$ and the resonant frequency $\omega s2$.

$$ab > 0 \tag{36}$$

$$(2ab + 1 + b)^2 - 8ab > 0 \tag{37}$$

$$(2ab + 1 + b)^2 > (2ab + 1 + b)^2 - 8ab \tag{38}$$

$$(2ab + 1 + b) > \sqrt{(2ab + 1 + b)^2 - 8ab}$$

$$\omega s2^2 > 0 \tag{39}$$

On the other hand, it is possible to separately obtain the solution of the quadratic equation expressed by the above Eq. (20), i.e., the resonant frequency $\omega p$ of the case where the capacitor C10 and the capacitor C20 are connected in parallel in the AC generation circuit 42, in two types of the resonant frequency $\omega p1$ of the case where the numerator on the right side is "+(positive)" and the resonant frequency $\omega p2$ of the case where the numerator on the right side is "−(negative)" as in the following Eqs. (40).

$$\omega p^2 = \frac{(4ab + a + 2b) \pm \sqrt{(4ab + a + 2b)^2 - 8ab}}{4abLsCy} \tag{40}$$

$$\omega p1^2 = \frac{(4ab + a + 2b) + \sqrt{(4ab + a + 2b)^2 - 8ab}}{4abLsCy}$$

$$\omega p2^2 = \frac{(4ab + a + 2b) - \sqrt{(4ab + a + 2b)^2 - 8ab}}{4abLsCy}$$

Also, in this case, the resonant frequency $\omega p1$ is necessarily present, but the resonant frequency $\omega p2$ is present when the numerator on the right side included in the above Eqs. (40) becomes the following Inequality (41) if the following Inequality (41) in the numerator of the right side included in the above Eqs. (40) is valid because a relationship between the coefficient a and the coefficient b is a relationship of the above Inequality (36) as in the case where the capacitor C10 and the capacitor C20 are connected in series. In other words, even if the capacitor C10 and the capacitor C20 are connected in parallel in the AC generation circuit 42, if the following Inequality (41) is valid in the numerator of the right side included in the above Eqs. (40), the following Inequality (43) is obtained and the resonant frequency $\omega p$ is present in two types of resonant frequencies $\omega p1$ and $\omega p2$.

$$(4ab + a + 2b)^2 - 8ab > 0 \tag{41}$$

$$(4ab + a + 2b)^2 > (4ab + a + 2b)^2 - 8ab \tag{42}$$

$$(4ab + a + 2b) > \sqrt{(4ab + a + 2b)^2 - 8ab}$$

$$\omega p2^2 > 0 \tag{43}$$

[Example of Resonant Frequency of AC Current]

Figure 6:
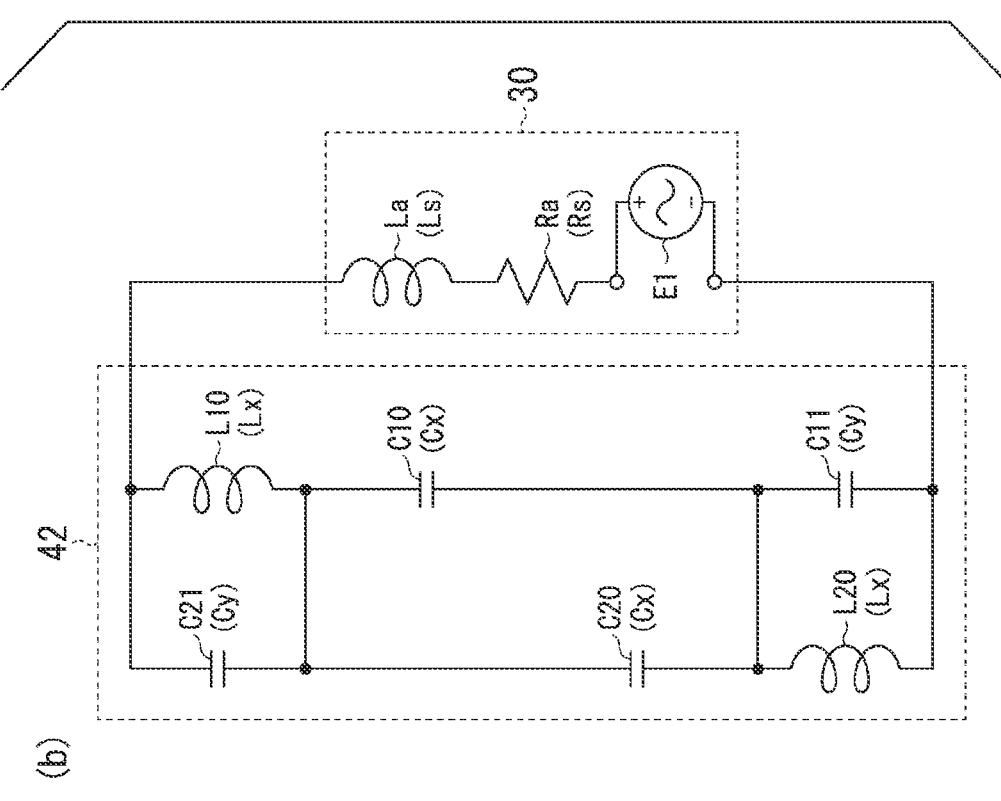
FIG. 6 is an example of an equivalent circuit for describing the resonant frequency of an AC current generated in the AC generation circuit of the embodiment.
Figure 6:
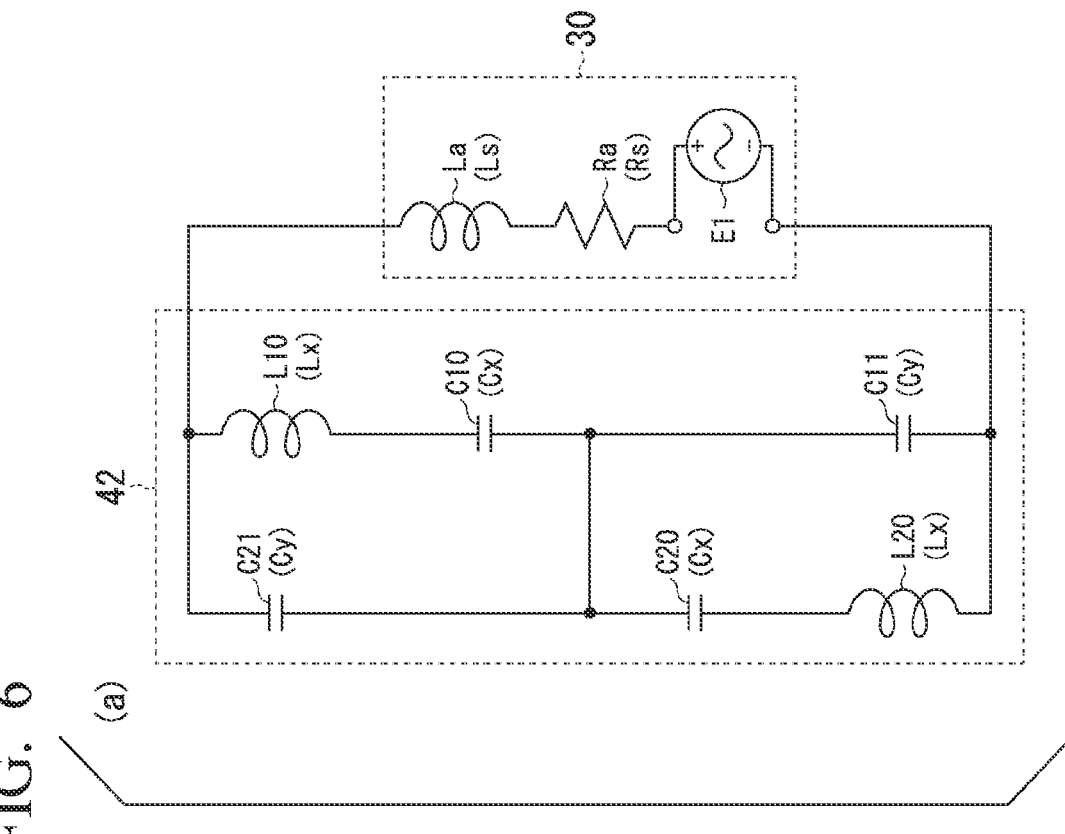

Here, an example of the resonant frequency to of the AC current generated by the AC generation circuit 42 will be described. FIG. 6 is an example of an equivalent circuit for describing the resonant frequency to of an AC current generated in the AC generation circuit 42 of the embodiment. In FIG. 6, an equivalent circuit of a case where a prescribed AC voltage is supplied from an AC power supply E1 to the AC generation circuit 42 in the battery 30 instead of a power storage unit Ba is shown. (a) of FIG. 6 shows an equivalent circuit when the capacitor C10 and the capacitor C20 are connected in series and (b) of FIG. 6 shows an equivalent circuit when the capacitor C10 and the capacitor C20 are connected in parallel.

Here, an example in which the resonant frequency to of the generated AC current, more specifically, the resonant frequency $\omega s1$ and the resonant frequency $\omega p1$ of the generated AC current, are 200 [kHz] in each equivalent circuit shown in FIG. 6 will be described. Here, it is assumed that the resistance component Rs of the resistance Ra and the inductance component Ls of the inductance La provided in the battery 30 have, for example, values shown in the following Eqs. (44). It is assumed that the coefficient b is temporarily set by the following Eq. (45).

$$Rs = 0.1\,\Omega \tag{44}$$

$$Ls = 300 \text{ nH}$$

$$b = 2.5 \tag{45}$$

In this case, the coefficient a can be obtained as shown in the following Eq. (46) on the basis of the above Eq. (30).

$$a = \frac{5 + 3\sqrt{16b^2 + 1}}{4(3b + 1)} \tag{46}$$

$$= 1.03381$$

Thereby, the inductances Lx of the inductor L10 and the inductor L20 can be obtained as shown in the following Eq. (47) on the basis of the above Eqs. (12).

$$Lx = aLs \tag{47}$$

$$= 310.1\,nH$$

Furthermore, the capacitances Cy of the capacitor C11 and the capacitor C21 can be obtained on the basis of the above Eqs. (35) as shown in the following Eq. (48). The capacitance Cy may be obtained on the basis of the above Eqs. (40).

$$Cy = \frac{(2ab + 1 + b) + \sqrt{(2ab + 1 + b)^2 - 8ab}}{2abLs \times (2\pi \times 200 \ \text{kHz})^2} \tag{48}$$

$$= 6.554 \ uF$$

Also, the capacitances Cx of the capacitor C10 and the capacitor C20 can be obtained as shown in the following Eq. (49) on the basis of the above Eqs. (12).

$$Cx = bCy \tag{49}$$

$$= 16.39 \ uF$$

In this way, the values (parameters) of the coefficient a, the inductance Lx, the capacitance Cy, and the capacitance Cx can be obtained on the basis of the temporarily set coefficient b (here, the coefficient b=2.5). Also, components (the capacitor C10, the capacitor C11, the capacitor C20, the capacitor C21, the inductor L10, and the inductor L20) adjusted (set) to the obtained values constitute the AC generation circuit 42. Thereby, it is possible to implement the AC generation circuit 42 in which at least the resonant frequency ωs1 generated when the capacitor C10 and the capacitor C20 are connected in series and the resonant frequency ωp1 generated when the capacitor C10 and the capacitor C20 are connected in parallel are equal (match). More specifically, it is possible to implement the AC generation circuit 42 for generating each of the resonant frequency cost and the resonant frequency ωs2 capable of being calculated as in the following Eqs. (50) on the basis of the above Eqs. (35) when the capacitor C10 and the capacitor C20 are connected in series and for generating each of the resonant frequency ωp1 and the resonant frequency ωp2 capable of being calculated as in the following Eqs. (51) on the basis of the above Eqs. (40) when the capacitor C10 and the capacitor C20 are connected in parallel.

In the calculation of the following Eqs. (50) and the following Eqs. (51), the angular frequency expressed as the resonant frequency to in each of the above Eqs. (35) and the above Eqs. (40) is calculated by expressing it as a normal frequency f as in the following Eqs. (52) and (53).

$$fs1 = \frac{1}{2\pi} \sqrt{\frac{(2ab + 1 + b) + \sqrt{(2ab + 1 + b)^2 - 8ab}}{2abLsCy}} \tag{50}$$

$$= 200 \ \text{kHz}$$

$$fs2 = \frac{1}{2\pi} \sqrt{\frac{(2ab + 1 + b) - \sqrt{(2ab + 1 + b)^2 - 8ab}}{2abLsCy}}$$

$$= 56.7 \ \text{kHz}$$

$$fp1 = \frac{1}{2\pi} \sqrt{\frac{(4ab + a + 2b) + \sqrt{(4ab + a + 2b)^2 - 8ab}}{4abLsCy}} \tag{51}$$

$$= 200 \ \text{kHz}$$

-continued $$fp2 = \frac{1}{2\pi} \sqrt{\frac{(4ab + a + 2b) - \sqrt{(4ab + a + 2b)^2 - 8ab}}{4abLsCy}}$$

$$= 28.3 \ \text{kHz}$$

$$\omega s^2 = \frac{(2ab + 1 + b) \pm \sqrt{(2ab + 1 + b)^2 - 8ab}}{2abLsCy} \tag{52}$$

$$fs = \frac{1}{2\pi} \sqrt{\frac{(2ab + 1 + b) \pm \sqrt{(2ab + 1 + b)^2 - 8ab}}{2abLsCy}}$$

$$\omega p^2 = \frac{(4ab + a + 2b) \pm \sqrt{(4ab + a + 2b)^2 - 8ab}}{4abLsCy} \tag{53}$$

$$fp = \frac{1}{2\pi} \sqrt{\frac{(4ab + a + 2b) \pm \sqrt{(4ab + a + 2b)^2 - 8ab}}{4abLsCy}}$$

As can be seen from the calculation results of the above Eqs. (50) and the above Eqs. (51), the resonant frequency ω is present in two types of the resonant frequency ωs1 (=frequency fs1) and the resonant frequency ωs2 (=frequency fs2) when the capacitor C10 and the capacitor C20 are connected in series and the resonant frequency to is present in two types of the resonant frequency ωp1 (=frequency fp1) and the resonant frequency ωp2 (=frequency fp2) when the capacitor C10 and the capacitor C20 are connected in parallel. At this time, the frequency fs1 and the frequency fp1 are equal at 200 [kHz]. That is, the resonant frequency ωs of the case where the capacitor C10 and the capacitor C20 are connected in series and the resonant frequency ωp of the case where the capacitor C10 and the capacitor C20 are connected in parallel match in at least one type.

Figure 7:
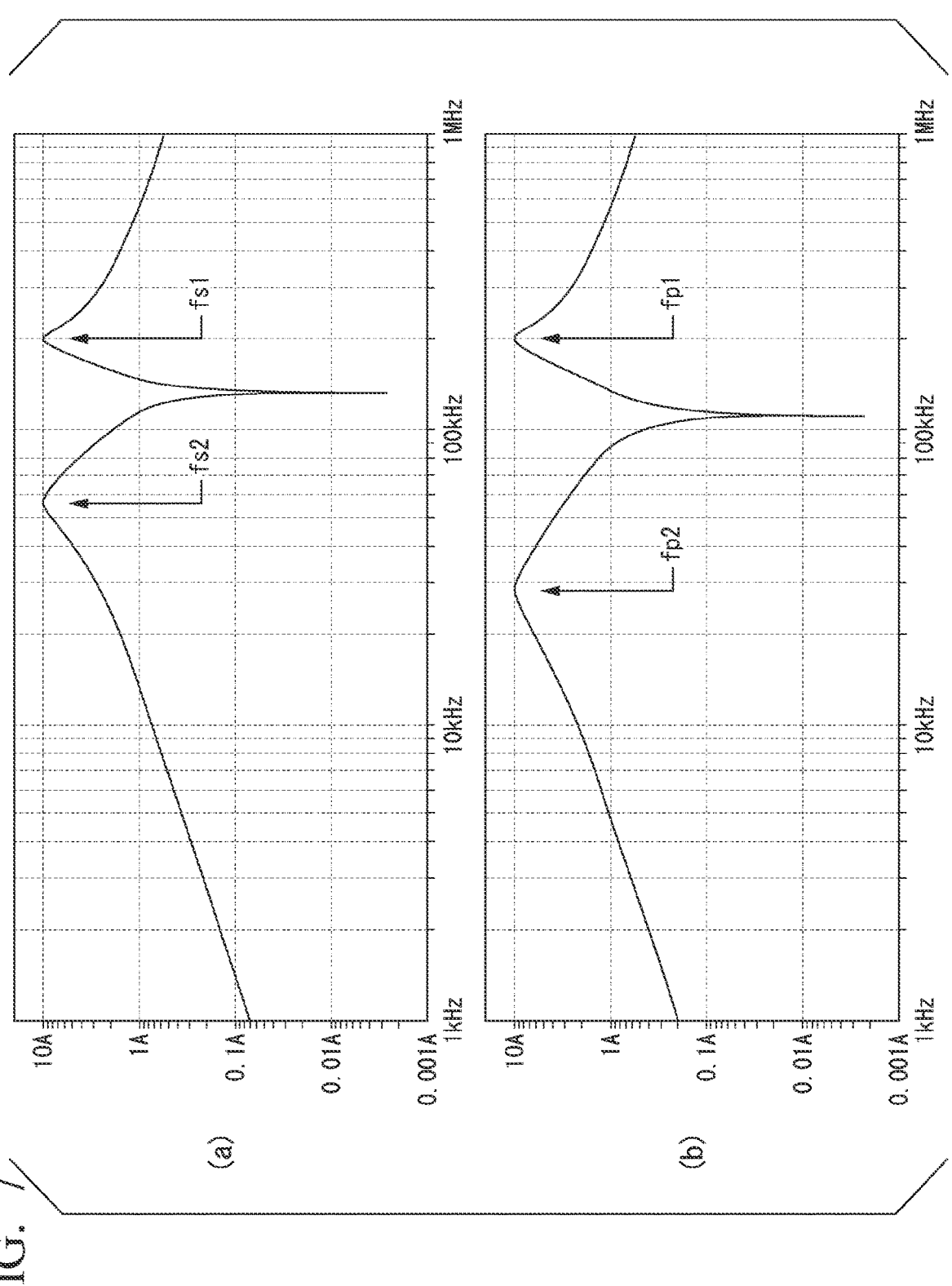
FIG. 7 is a diagram showing an example of frequency characteristics of an AC current generated in the AC generation circuit of the embodiment.

FIG. 7 is a diagram showing an example of the frequency characteristics (simulation characteristics) of the AC current generated in the AC generation circuit 42 of the embodiment. An example of the frequency characteristics shown in FIG. 7 is an example of a case where components of each equivalent circuit shown in FIG. 6 are adjusted to values calculated according to the above Eqs. (44) to (49). In FIG. 7, an example of an amplitude of an AC current when an AC voltage having an amplitude of 1 [V] is supplied from the AC power supply E1 is shown. (a) of FIG. 7 shows an example of frequency characteristics when the capacitor C10 and the capacitor C20 are connected in series and (b) of FIG. 7 shows an example of frequency characteristics when the capacitor C10 and the capacitor C20 are connected in parallel. In (a) of FIG. 7 and (b) of FIG. 7, the horizontal axis represents a frequency and the vertical axis represents an electric current value of the AC current to be generated. The vertical axis represents the amplitude of the AC current to be generated.

As shown in (a) and (b) of FIG. 7, it can be seen that each resonant frequency to is present in two types because the current value peaks at two resonance points in both cases where capacitor C10 and capacitor C20 are connected in series and in parallel. More specifically, in an example of the frequency characteristics in the case where the capacitor C10 and the capacitor C20 are connected in series shown in (a) of FIG. 7, it can be seen that there are resonance points where the current value peaks at locations of the frequency fs1 and the frequency fs2 calculated as shown in the above Eqs. (50). On the other hand, in an example of the frequency characteristics in the case where the capacitor C10 and the capacitor C20 are connected in parallel shown in (b) of FIG. 7, it can be seen that there are resonance points where the current value peaks at locations of the frequency fp1 and the frequency fp2 calculated as shown in the above Eqs. (51). From this, it can be seen that the AC generation circuit 42 having two resonant frequencies to can be implemented by including components adjusted (set) to values calculated according to the above Eqs. (44) to (49).

In this way, the AC generation circuit 42 includes the capacitor C10, the capacitor C11, the capacitor C20, the capacitor C21, the inductor L10, and the inductor L20 having values (parameters) of the coefficient a, the inductance Lx, the capacitance Cy, and the capacitance Cx obtained on the basis of the temporarily set coefficient b. Thereby, in the AC generation circuit 42, it is possible to implement a configuration in which the frequency f is equal (matches) in at least one of the frequency fs1 of the case where the capacitors C10 and C20 are connected in series and the frequency fp1 of the case where the capacitors C10 and C20 are connected in parallel.

In the AC generation circuit 42, for example, if a configuration in which a plurality of batteries 30 are combined is adopted for the battery 30 mounted in the vehicle 1, it is possible to reduce the total voltage fluctuation when the temperature of the battery 30 is raised by connecting AC generation circuits 42 to the batteries 30 and providing a prescribed phase difference between electric current waveforms of the AC currents generated by the AC generation circuits 42. That is, it is possible to reduce the total voltage fluctuation when the temperature of the battery 30 is raised by shifting the phase of the electric current waveform of the AC current generated by each AC generation circuit 42 by a prescribed phase between the AC generation circuits 42. For example, if a configuration in which two batteries 30 are combined is adopted for the battery 30 mounted in the vehicle 1, it is possible to reduce the total voltage fluctuation when the temperature of the battery 30 is raised by shifting the phase of the electric current waveform of the AC current generated by the AC generation circuit 42 connected to each battery 30 by 180°. For example, if a configuration in which three batteries 30 are combined is adopted for the battery 30 mounted in the vehicle 1, it is possible to reduce the total voltage fluctuation when the temperature of the battery 30 is raised by shifting the phase of the electric current waveform of the AC current generated by the AC generation circuit 42 connected to each battery 30 by 120°. This is because the electric current waveform of the AC current generated by each AC generation circuit 42 is an electric current waveform close to a waveform of a symmetrical sinusoidal wave at the time of the positive (+) current value and at the time of the negative (−) current value. Thereby, the temperature raising device 40 can efficiently raise the temperature of the battery 30.

[Operation of Temperature Raising Device]

Next, an example of the operation of the temperature raising device 40 will be described. Here, a case where batteries 30 mounted in the vehicle 1 have a configuration in which two batteries 30 (a battery 30a and a battery 30b) are combined will be described. In this case, the temperature is raised by connecting one AC generation circuit 42 to each battery 30 and applying a generated AC current thereto (or causing the generated AC current to flow therethrough). At this time, the controller 44 reduces the total voltage fluctuation (so-called voltage waveform ripple) associated with a voltage output by the set of two batteries 30 by performing a control process so that a phase of an AC current to be generated by each AC generation circuit 42 is shifted by a prescribed phase (here, the phase is shifted by 180°). In other words, the controller 44 reduces the total voltage fluctuation when the temperatures of the two batteries 30 are raised by shifting the timing of the control signal CS and inputting the control signal CS to each AC generation circuit 42 so that each AC generation circuit 42 operates in the opposite direction. The battery 30a is an example of a "first power storage" and the battery 30b is an example of a "second power storage."

[Operation of Temperature Raising Device in Comparative Example]

Figure 8:
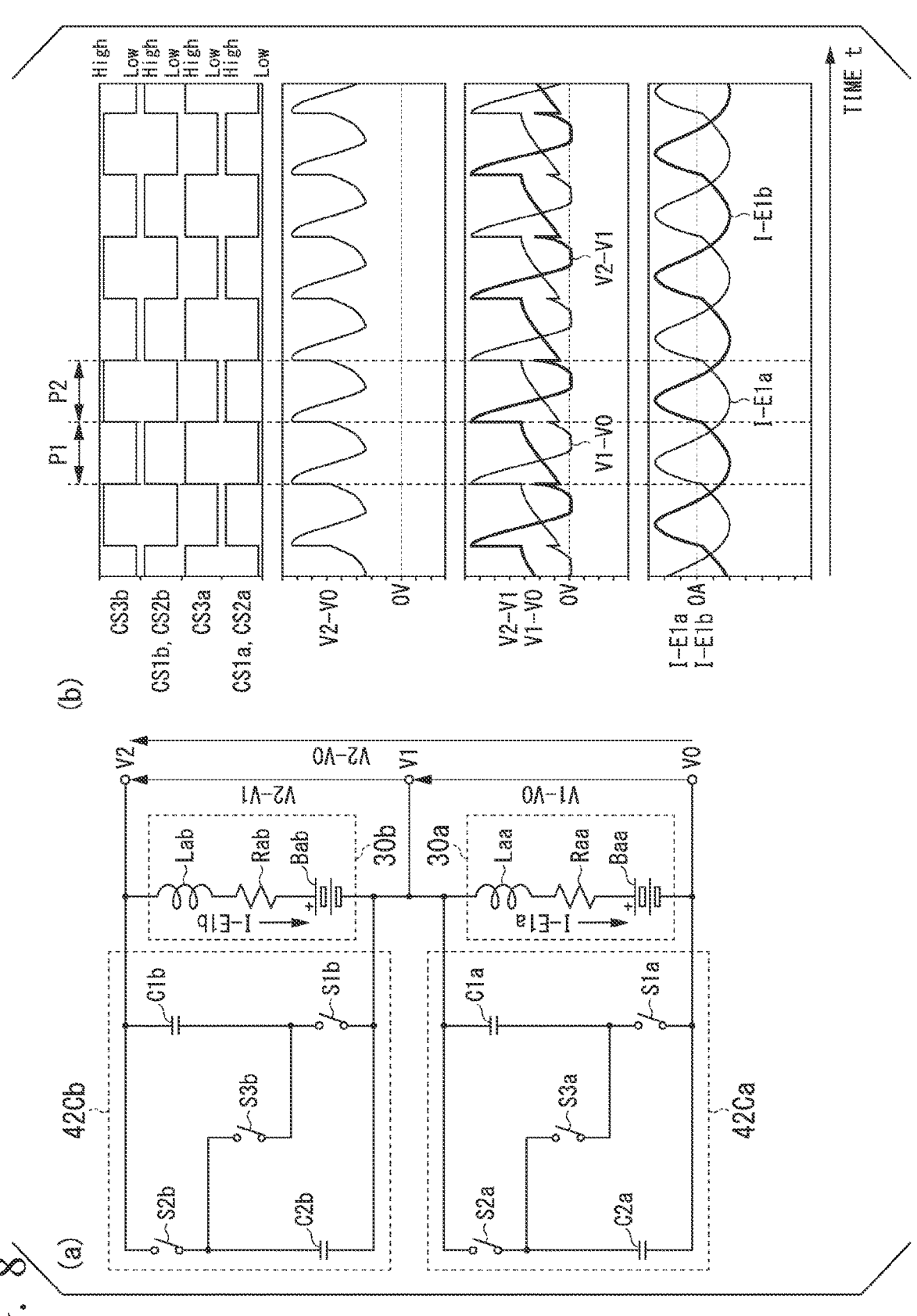
FIG. 8 is a diagram showing an example of a configuration and operating waveforms of a temperature raising device adopting the AC generation circuit of the comparative example.

First, the operation of the temperature raising device (hereinafter referred to as the "temperature raising device 40C") adopting the AC generation circuit 42C of the comparative example shown in FIG. 4 will be described for the comparison with the operation of the temperature raising device 40. FIG. 8 is a diagram showing an example of a configuration and operating waveforms (simulation waveforms) of the temperature raising device 40C adopting the AC generation circuit 42C of the comparative example. FIG. 8 is an example of a case where the resonant frequency ω of the AC current generated in the AC generation circuit 42C is 200 [kHz].

In (a) of FIG. 8, the connections of AC generation circuits 42C (an AC generation circuit 42Ca and an AC generation circuit 42Cb) corresponding to the batteries 30 and the AC currents flowing through the batteries 30 to which the AC generation circuits 42C are connected are shown. In (b) of FIG. 8, an example of a control signal output to each switch by the controller 44, an AC current within each battery 30, and a change in the output voltage is shown. In FIG. 8, "a" at the end of each reference sign indicates correspondence to the AC generation circuit 42Ca and "b" indicates correspondence to the AC generation circuit 42Cb.

As shown in (a) of FIG. 8, in the case of a configuration in which two batteries are combined, the AC generation circuit 42Ca is connected to one battery 30a and the AC generation circuit 42Cb is connected to the other battery 30b. The controller 44 outputs a control signal to a switch provided in each AC generation circuit 42C so that the phase of the AC current generated by each AC generation circuit 42C becomes a phase shifted by 180°. In (a) of FIG. 8, an example of a voltage measurement position and an electric current flow direction changed in each battery 30 by the controller 44 controlling each switch according to a control signal is shown. More specifically, a voltage V1-V0 between the two electrodes of the battery 30a (including inductance Laa) and a current I-Ela flowing through the battery 30a (including the inductance Laa) are shown as an example of a voltage and a current corresponding to the AC generation circuit 42Ca. Furthermore, a voltage V2-V1 between the electrodes of the battery 30b (including inductance Lab) and a current I-E1b flowing through the battery 30b (including the inductance Lab) are shown as an example of a voltage and a current corresponding to the AC generation circuit 42Cb. Also, in (a) of FIG. 8, as a total voltage obtained by combining the battery 30a and the battery 30b, a voltage V2-V0 between two ends that are one end (V0) of the negative electrode side of the battery 30a in the AC generation circuit 42Ca and one end (V2) of the positive electrode side of the battery 30b in the AC generation circuit 42Cb is shown.

In (b) of FIG. 8, an example of changes in a control signal CS for controlling each AC generation circuit 42C in the controller 44 and currents and voltages in the AC generation circuit 42Ca and the AC generation circuit 42Cb is shown. In (b) of FIG. 8, it is assumed that the controller 44 sets the corresponding switch in the conductive state by setting each control signal CS at a "High" level and sets the corresponding switch in the non-conductive state by setting each control signal CS at a "Low" level. In (b) of FIG. 8, the controller 44 outputs a control signal CS to each switch with a duty ratio of 1:1, i.e., a duty ratio of 50%. Although the controller 44 may set a dead time during which all switches are in the non-conductive state between a period during which the switches are in the conductive state and a period during which the switches are in the non-conductive state as described above, a case where the controller 44 controls each switch without providing a dead time is shown in (b) of FIG. 8.

In (b) of FIG. 8, an example of changes in the voltage V1-V0 and the current I-Ela changed by the controller 44 controlling a control signal CS1*a*, a control signal CS2*a*, and a control signal CS3*a* for the AC generation circuit 42Ca is shown. Furthermore, in (b) of FIG. 8, an example of changes in the voltage V2-V1 and the current I-E1*b* changed by the controller 44 controlling a control signal CS1*b*, a control signal CS2*b*, and a control signal CS3*b* for the AC generation circuit 42Cb is shown. Also, in (b) of FIG. 8, an example of a change in the voltage V2-V0 is shown.

As shown in (b) of FIG. 8, in a period P1, the controller 44 sets the control signal CS1*a* and the control signal CS2*a* of the AC generation circuit 42Ca at the "Low" level and sets the control signal CS3*a* at the "High" level. Thereby, in the AC generation circuit 42Ca, the capacitor C1*a* and the capacitor C2*a* are connected in series with the battery 30*a* and the current I-Ela mainly flows in the positive region. Thereby, the voltage V1-V0 of the AC generation circuit 42Ca mainly decreases from a positive peak voltage to a negative peak voltage. Subsequently, as shown in (b) of FIG. 8, in a period P2, the controller 44 sets the control signal CS1*a* and the control signal CS2*a* of the AC generation circuit 42Ca at the "High" level and sets the control signal CS3*a* at the "Low" level. Thereby, in the AC generation circuit 42Ca, the capacitor C1*a* and the capacitor C2*a* are connected in parallel to the battery 30*a* and the current I-Ela mainly flows in the negative region. Thereby, the voltage V1-V0 of the AC generation circuit 42Ca mainly increases from the negative peak voltage to the positive peak voltage.

As shown in (b) of FIG. 8, in the AC generation circuit 42Cb, the controller 44 also controls the control signal CS1*b*, the control signal CS2*b*, and the control signal CS3*b* in the period P1 and the period P2. Thereby, in the AC generation circuit 42Cb, as in the AC generation circuit 42Ca, the current I-E1*b* also flows. In this regard, as described above, the controller 44 outputs the control signals CS so that the phases of the AC currents generated by the AC generation circuits 42C are shifted by 180° from each other. Thus, the phase of the current I-E1*b* flowing in the battery 30*b* to which the AC generation circuit 42Cb is connected is shifted by 180° from the phase of the current I-Ela flowing in the battery 30*a* to which the AC generation circuit 42Ca is connected. Thereby, the phase of the voltage V2-V1 of the AC generation circuit 42Cb is also shifted by 180° from the phase of the voltage V1-V0 of the AC generation circuit 42Ca.

Thus, in the temperature raising device 40C, the controller 44 outputs the control signal CS to each switch, such that the voltage V2-V0 becomes a sum of the voltage V1-V0 of the AC generation circuit 42Ca and the voltage V2-V1 of the AC generation circuit 42Cb as shown in (b) of FIG. 8. However, as can be seen from the waveform of the voltage V2-V0 shown in (b) of FIG. 8, the amplitude is narrower than the amplitude of the voltage V1-V0 or the voltage V2-V1, but the voltage waveform is not close to a waveform of a sinusoidal wave. This is because the controller 44 switches the connections of the capacitor C1 and the capacitor C2 to the battery 30 to the series connection or the parallel connection, but the electric current waveform of the AC current (the current I-Ela or the current I-E1*b*) generated by each AC generation circuit 42C does not become a waveform of a sinusoidal wave and the amplitude of the AC current is also different between the positive region and the negative region, i.e., there is asymmetry in the positive region and the negative region. As a result, it is difficult to sufficiently reduce the overall voltage fluctuation (voltage waveform ripple) when the temperature of the battery 30 is raised.

Meanwhile, in the AC generation circuit 42C, as described above, the resonant frequency ωs of the case where the capacitor C1 and the capacitor C2 are connected in series is twice the resonant frequency ωp of the case where the capacitor C1 and the capacitor C2 are connected in parallel. Thus, in the AC generation circuit 42C, a case where the controller 44 sets the duty ratio to 1:2 and switches the connections of the capacitor C1 and the capacitor C2 provided in each AC generation circuit 42C to the battery 30 to the series connection or the parallel connection is preferably conceivable.

[Other Operations of Temperature Raising Device in Comparative Example]

Figure 9:
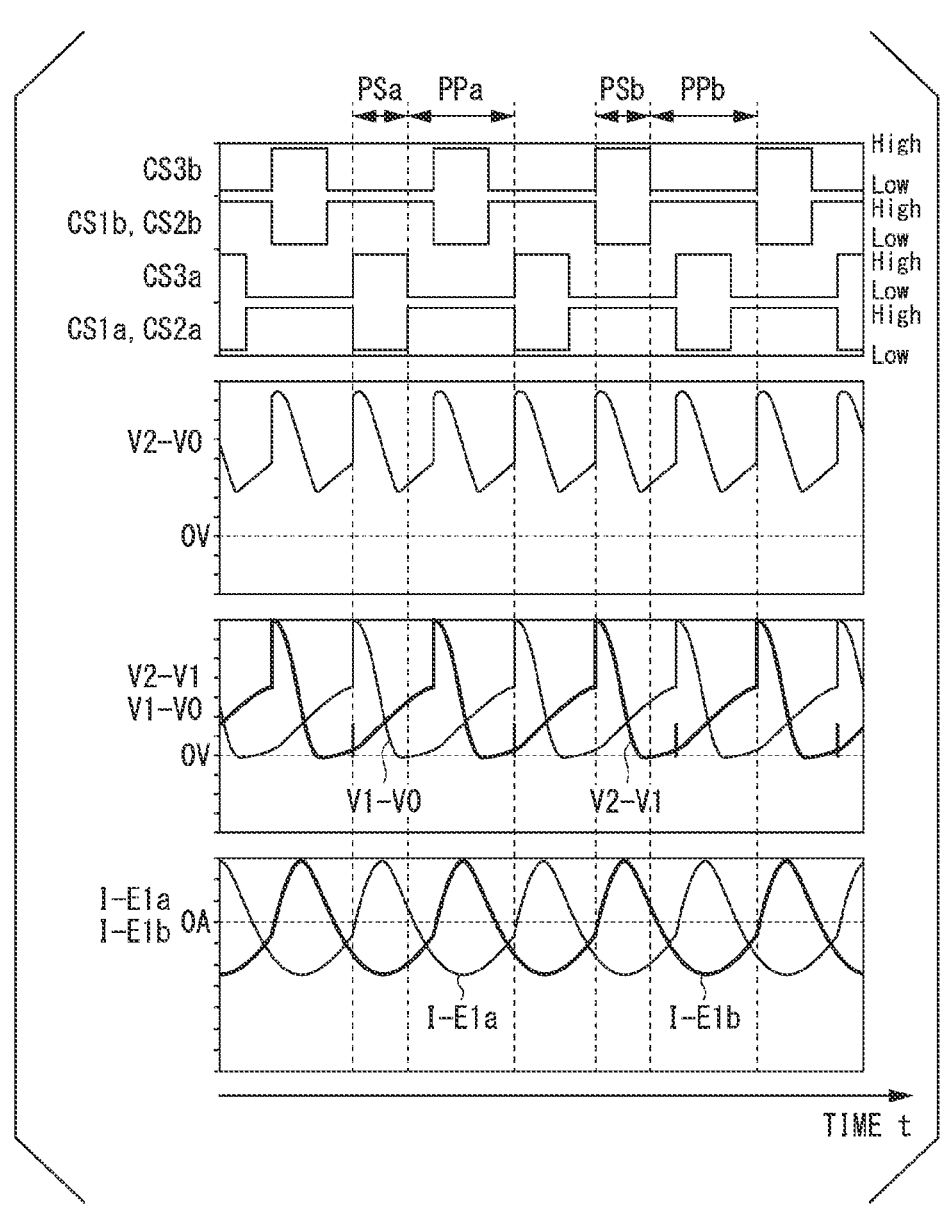
FIG. 9 is a diagram showing an example of another operating waveforms of the temperature raising device adopting the AC generation circuit of the comparative example.

FIG. 9 is a diagram showing an example of another operating waveforms (simulation waveforms) of the temperature raising device 40C adopting the AC generation circuit 42C of a comparative example. FIG. 9 shows an example in which the controller 44 switches the connections of the capacitor C1 and the capacitor C2 in each AC generation circuit 42C to the battery 30 to the series connection or the parallel connection with a duty ratio of 1:2 in the configuration shown in (a) of FIG. 8. FIG. 9 is also an example of a case where the resonant frequency to of the AC current generated in the AC generation circuit 42C is 200 [kHz].

In FIG. 9, as in (b) of FIG. 8, an example of changes in a control signal CS for the controller 44 to control each AC generation circuit 42C and currents and voltages in the AC generation circuit 42Ca and the AC generation circuit 42Cb is shown. Also, in FIG. 9, "a" at the end of each reference sign indicates correspondence to the AC generation circuit 42Ca shown in (a) of FIG. 8 and "b" indicates correspondence to the AC generation circuit 42Cb shown in (a) of FIG. 8.

As shown in FIG. 9, in a period PSa, the controller 44 sets the control signal CS1*a* and the control signal CS2*a* of the AC generation circuit 42Ca at the "Low" level and sets the control signal CS3*a* at the "High" level. Thereby, in the AC generation circuit 42Ca, the capacitor C1*a* and the capacitor C2*a* are connected in series with the battery 30*a* and the current I-Ela mainly flows in the positive region as in (b) of FIG. 8. Thereby, the voltage V1-V0 of the AC generation circuit 42Ca mainly decreases from a positive peak voltage to a negative peak voltage as in (b) of FIG. 8. Subsequently, in a period PPa, the controller 44 sets the control signal CS1*a* and the control signal CS2*a* of the AC generation circuit 42Ca at the "High" level and sets the control signal CS3*a* at the "Low" level. Thereby, in the AC generation circuit 42Ca, the capacitor C1*a* and the capacitor C2*a* are connected in parallel to the battery 30*a* and the current I-Ela mainly flows in the negative region as in (b) of FIG. 8. Thereby, the voltage V1-V0 of the AC generation circuit 42Ca mainly increases from the negative peak voltage to the positive peak voltage as in (b) of FIG. 8.

As shown in FIG. 9, in the AC generation circuit 42Cb, the controller 44 also controls the control signal CS1*b*, the control signal CS2*b*, and the control signal CS3*b* in a period PSb and a period PPb. Thereby, in the AC generation circuit 42Cb, as in the AC generation circuit 42Ca, the current I-E1*b* also flows. At this time, as described above, the controller 44 outputs the control signals CS so that the phases of the AC currents generated by the AC generation circuits 42C are shifted by 180° from each other. Thus, as in (b) of FIG. 8, the phase of the current I-E1*b* flowing in the battery 30b to which the AC generation circuit 42Cb is connected is shifted by 180° from the phase of the current I-Ela flowing in the battery 30a to which the AC generation circuit 42Ca is connected. Thereby, the phase of the voltage V2-V1 of the AC generation circuit 42Cb is also shifted by 180° from the phase of the voltage V1-V0 of the AC generation circuit 42Ca as in (b) of FIG. 8.

Thus, in the temperature raising device 40C, the controller 44 outputs a control signal CS to each switch with a duty ratio of 1:2, such that the voltage V2-V0 becomes a sum of the voltage V1-V0 of AC generation circuit 42Ca and the voltage V2-V1 of AC generation circuit 42Cb as in (b) of FIG. 8. However, as can be seen from a waveform of the voltage V2-V0 shown in FIG. 9, the voltage waveform is not close to a sinusoidal wave as in (b) of FIG. 8. This is because even if the controller 44 switches the connections of the capacitor C1 and the capacitor C2 to the battery 30 to a series connection or a parallel connection with a duty ratio of 1:2 so that the resonant frequency ωs and the resonant frequency ωp are combined, the electric current waveform of the current I-Ela or the current I-E1*b* generated by each AC generation circuit 42C does not become a sinusoidal wave and the amplitude of the AC current is still different between the positive and negative regions (or asymmetrical in the positive and negative regions). Thus, as shown in FIG. 9, even if the controller 44 switches the connections of the capacitors C1 and C2 provided in each AC generation circuit 42C to the battery 30 to a series connection or a parallel connection with a duty ratio of 1:2, it is difficult to sufficiently reduce the overall voltage fluctuation (voltage waveform ripple) when the temperature of the battery 30 is raised.

Figure 10:
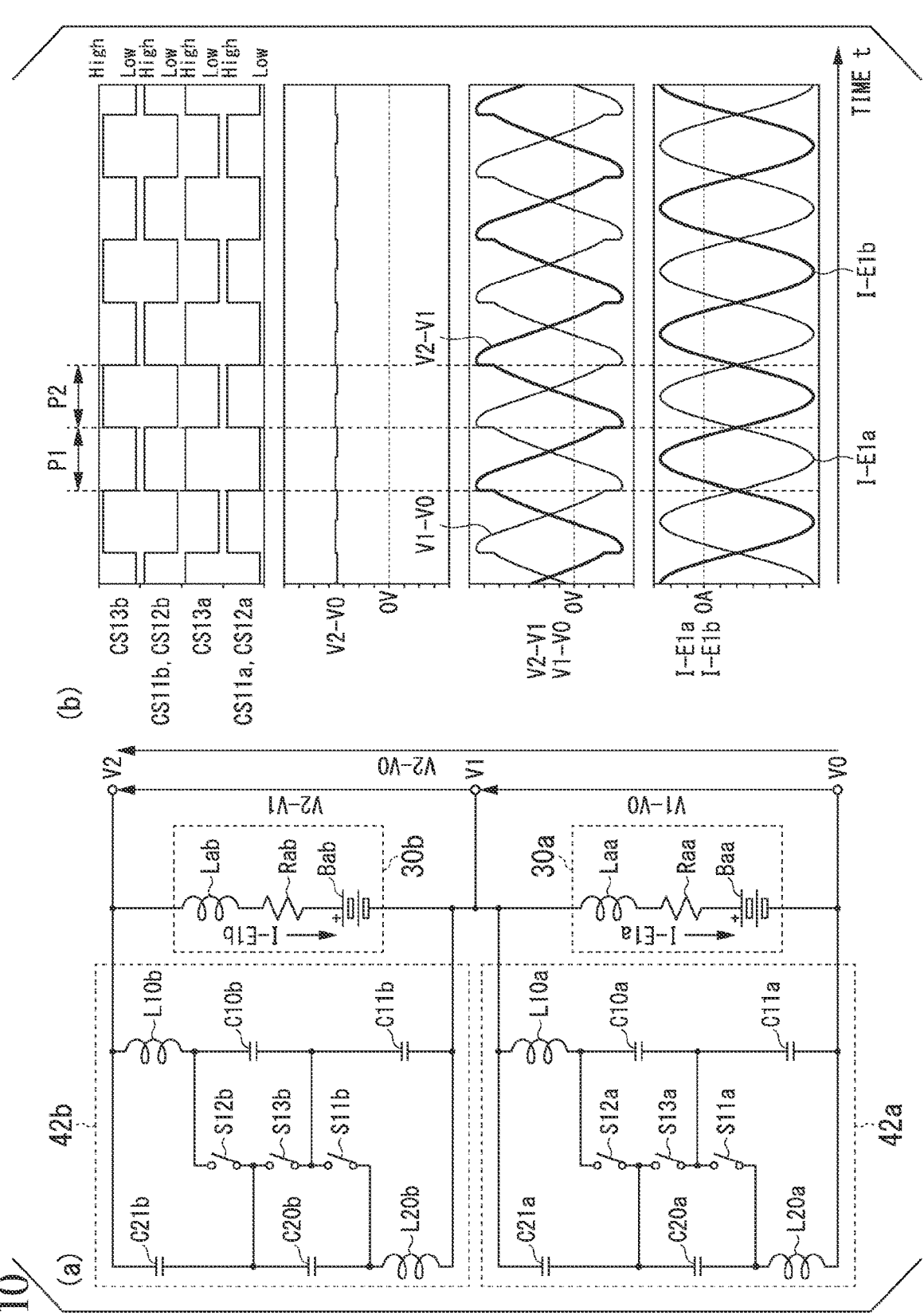
FIG. 10 is a diagram showing an example of a configuration and operating waveforms of the temperature raising device adopting the AC generation circuit of the embodiment.

Next, an operation of the temperature raising device 40 will be described. FIG. is a diagram showing an example of a configuration and operating waveforms (simulation waveforms) of the temperature raising device 40 adopting the AC generation circuit 42 of the embodiment. FIG. 10 is an example of a case where values (parameters) of components provided in the AC generation circuit 42 are adjusted to values calculated by the above Eqs. (44) to (49), and the resonant frequency to of the AC current generated by the AC generation circuit 42 is 200 [kHz] as in the example of the operating waveform of the AC generation circuit 42C of the comparative example shown in FIG. 8.

In (a) of FIG. 10, the connections of the AC generation circuits 42 (the AC generation circuit 42a and the AC generation circuit 42b) corresponding to the batteries and the AC currents flowing in the batteries 30 to which the AC generation circuits 42 are connected are shown. In (b) of FIG. 10, an example of changes in a control signal output to each switch by the controller 44 and an AC current and an output voltage in each battery 30 is shown. In FIG. 10, "a" at the end of each reference sign indicates correspondence to the AC generation circuit 42a and "b" indicates correspondence to the AC generation circuit 42b. The AC generation circuit 42a is an example of an "AC generation circuit" and the AC generation circuit 42b is an example of a "second AC generation circuit." The AC current generated by the AC generation circuit 42a is an example of an "AC current" and the AC current generated by the AC generation circuit 42b is an example of a "second AC current."

As shown in (a) of FIG. 10, in the case of the configuration in which the two batteries 30 are combined, the AC generation circuit 42a is connected to one battery 30a, and the AC generation circuit 42b is connected to the other battery 30b. Also, the controller 44 outputs a control signal to a switch provided in each AC generation circuit 42 so that the phase of the AC current generated by each AC generation circuit 42 is shifted by 180°. In (a) of FIG. 10, an example of a voltage measurement position and an electric current flow direction changed in each battery 30 by the controller 44 controlling each switch according to a control signal is shown. More specifically, a voltage V1-V0 between the two electrodes of the battery 30a (including inductance Laa), and a current I-Ela flowing through the battery 30a (including the inductance Laa) are shown as an example of a voltage and a current corresponding to the AC generation circuit 42a. Furthermore, a voltage V2-V1 between the two electrodes of the battery 30b (including inductance Lab) and a current I-E1*b* flowing through the battery 30b (including the inductance Lab) are shown as an example of a voltage and a current corresponding to the AC generation circuit 42b. Also, in (a) of FIG. 10, as a total voltage obtained by combining the battery 30a and the battery 30b, a voltage V2-V0 between two ends that are one end (V0) of the negative electrode side of the battery 30a in the AC generation circuit 42a and one end (V2) of the positive electrode side of the battery 30b in the AC generation circuit 42b is shown.

In (b) of FIG. 10, an example of changes in a control signal CS for controlling each AC generation circuit 42 in the controller 44 and currents and voltages in the AC generation circuit 42a and the AC generation circuit 42b is shown. In (b) of FIG. 10, it is assumed that the controller 44 sets the corresponding switch in the conductive state by setting each control signal CS at a "High" level and sets the corresponding switch in the non-conductive state by setting each control signal CS at a "Low" level. In the AC generation circuit 42, as described above, the resonant frequency ωs of the case where the capacitor C10 and the capacitor C20 are connected in series is the same as the resonant frequency ωp of the case where the capacitor C10 and the capacitor C20 are connected in parallel. Thus, in (b) of FIG. 10, the controller 44 outputs a control signal CS to each switch at a duty ratio of 1:1, i.e., a duty ratio of 50%. Although the controller 44 may provide a dead time for setting all switches in the non-conductive state between a period in which the switch is set in the conductive state and a period in which the switch is set in the non-conductive state as described above, a case where the controller 44 controls each switch without setting any dead time is shown in (a) of FIG.

In (b) of FIG. 10, an example of changes in the voltage V1-V0 and the current I-Ela changed by the controller 44 controlling a control signal CS11*a*, a control signal CS12*a*, and a control signal CS13*a* with respect to the AC generation circuit 42a is shown. Furthermore, in (b) of FIG. 10, an example of changes in the voltage V2-V1 and the current I-E1*b* changed by the controller 44 controlling a control signal CS11*b*, a control signal CS12*b*, and a control signal CS13*b* with respect to the AC generation circuit 42b is shown. Also, in (b) of FIG. 10, an example of a change in the voltage V2-V0 is shown.

As shown in (b) of FIG. 10, in the period P1, the controller 44 sets the control signal CS11*a* and the control signal CS12a of the AC generation circuit 42a at the "Low" level and sets the control signal CS13a at the "High" level. Thereby, in the AC generation circuit 42a, the capacitor C10a and the capacitor C20a are connected in series with the battery 30a and the current I-E1a mainly flows in the negative region. Thereby, the voltage V1-V0 of the AC generation circuit 42a mainly increases from a negative peak voltage to a positive peak voltage. On the other hand, in the period P1, the controller 44 sets the control signal CS11b and the control signal CS12b of the AC generation circuit 42b at the "High" level and sets the control signal CS13b at the "Low" level. Thereby, in the AC generation circuit 42b, the capacitor C10b and the capacitor C20b are connected in parallel to the battery 30a and the current I-E1b mainly flows in the positive region. Thereby, the voltage V2-V1 of the AC generation circuit 42b mainly decreases from the positive peak voltage to the negative peak voltage.

Subsequently, as shown in (b) of FIG. 10, in the period P2, the controller 44 sets the control signal CS11a and the control signal CS12a of the AC generation circuit 42a at the "High" level and sets the control signal CS13a at the "Low" level. Thereby, in the AC generation circuit 42a, the capacitor C10a and the capacitor C20a are connected in parallel to the battery 30a and the current I-E1a mainly flows in the positive region. Thereby, the voltage V1-V0 of the AC generation circuit 42a mainly decreases from the positive peak voltage to the negative peak voltage. On the other hand, in the period P2, the controller 44 sets the control signal CS11b and the control signal CS12b of the AC generation circuit 42b at the "Low" level and sets the control signal CS13b at the "High" level. Thereby, in the AC generation circuit 42b, the capacitor C10b and the capacitor C20b are connected in series with the battery 30a and the current I-E1b mainly flows in the negative region. Thereby, the voltage V2-V1 of the AC generation circuit 42b mainly increases from the negative peak voltage to the positive peak voltage.

In this way, as described above, the controller 44 outputs the control signals CS so that the phases of the AC currents generated by the AC generation circuits 42 are shifted by 180° from each other. Thereby, the current I-E1a flowing in the battery 30a to which the AC generation circuit 42a is connected is shifted by 180° from the current I-E1b flowing in the battery 30b to which the AC generation circuit 42b is connected. Thereby, the phases of both the voltage V1-V0 of the AC generation circuit 42a and the voltage V2-V1 of the AC generation circuit 42b are also shifted by 180° from each other.

Thus, in the temperature raising device 40, the controller 44 outputs a control signal CS to each switch with a duty ratio of 50% and switches the connections of the capacitor C10 and the capacitor C20 to the battery 30 to a series connection or a parallel connection, such that a current I-E1a flows in the battery 30a to which the AC generation circuit 42a is connected and a current I-E1b flows in the battery 30b to which the AC generation circuit 42b is connected. Moreover, as can be seen from the waveforms of the current I-E1a and the current I-E1b shown in (b) of FIG. 10, the electric current waveform of each AC current is closer to a sinusoidal waveform than the electric current waveform of the AC current (the current I-E1a or the current I-E1b) generated by each AC generation circuit 42 shown in FIG. 8 in the temperature raising device 40C. Thereby, in the temperature raising device 40, the voltage V1-V0 of the AC generation circuit 42a and the voltage V2-V1 of the AC generation circuit 42b are symmetrical in positive and negative regions. Thereby, in the temperature raising device 40, the voltage waveform of the voltage V2-V0 obtained by adding the voltage V1-V0 and the voltage V2-V1 has a significantly smaller voltage fluctuation (voltage waveform ripple) than the voltage waveform of the voltage V2-V0 in the temperature raising device 40C shown in FIG. 8, as can be seen from the waveform of the voltage V2-V0 shown in (b) of FIG. 10. In other words, in the temperature raising device 40, the voltage V2-V0 has little variation and has a level that can be said to have flat characteristics.

Thus, when a configuration in which two batteries 30 (here, the battery 30a and the battery 30b) are combined is adopted for the battery 30 mounted in the vehicle 1 in the temperature raising device 40, the controller 44 outputs a control signal CS having a duty ratio of 50% to each switch and switches the connections of the capacitor C10 and the capacitor C20 to the battery 30 to the series connection or the parallel connection. In other words, the controller 44 performs a control process by shifting the phase of the control signal CS by a prescribed phase (here, shifting the phase by 180°) and outputting the control signal CS having the shifted phase so that the AC generation circuit 42 corresponding to each battery 30 operates in the opposite direction. Thereby, as shown in (b) of FIG. 10, the AC generation circuit 42 can reduce the fluctuation of the total voltage V2-V0 obtained by combining the two batteries 30. In other words, the AC generation circuit 42 can generate an AC current in which the harmonic component is reduced and reduce noise emitted when the temperature of the battery 30 is raised. From this, the AC generation circuit 42 is more applicable as a configuration in which the temperature is raised by applying an AC current to each battery 30 (or causing an AC current to flow through each battery 30) when a configuration in which two batteries 30 are combined is adopted for the battery 30 mounted in the vehicle 1 and in which the fluctuation in the total voltage (so-called voltage waveform ripple) output by the set of the two batteries 30 is reduced.

[Another Configuration of Temperature Raising Device]

Figure 11:
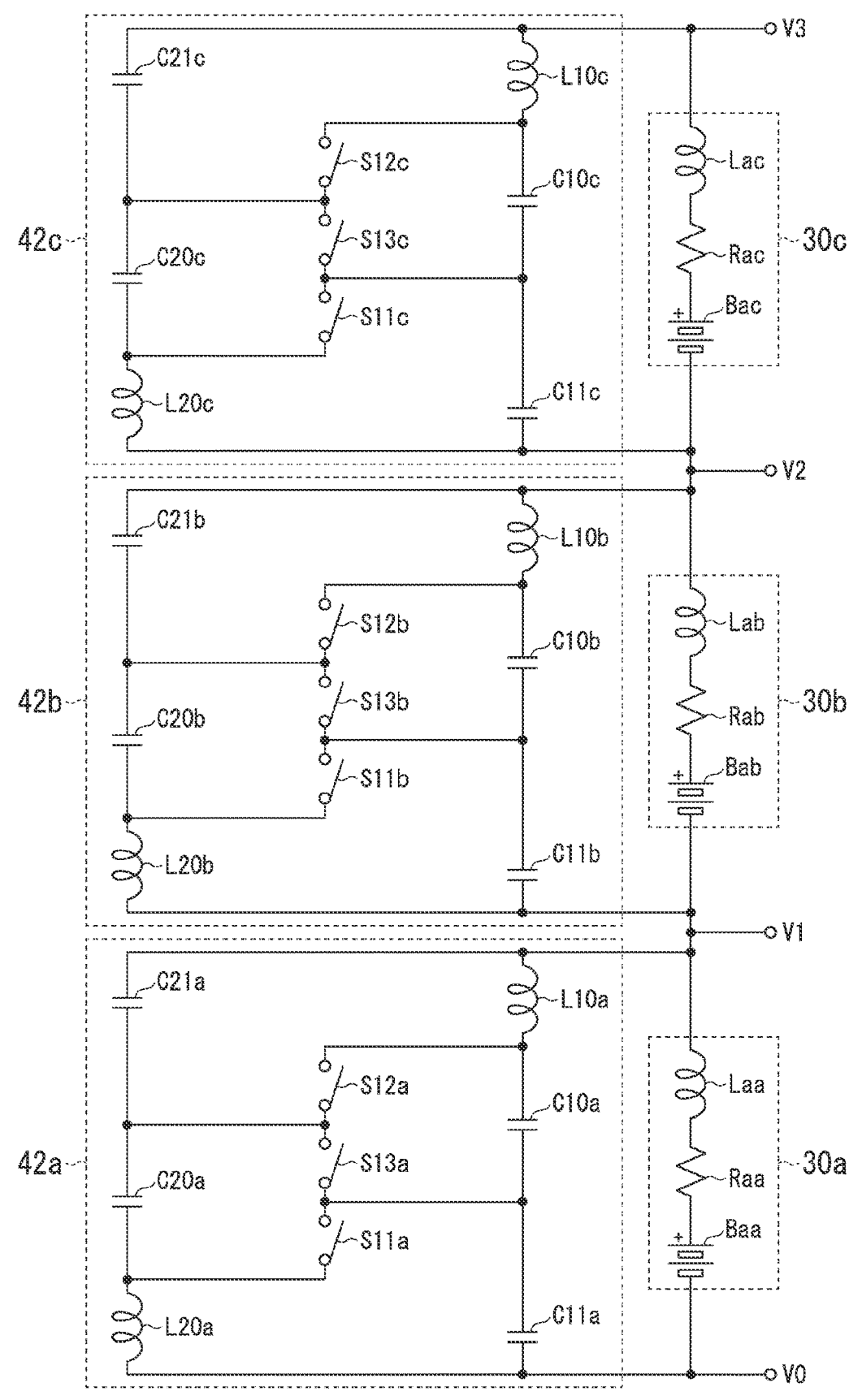
FIG. 11 is a diagram showing an example of another configuration of the temperature raising device adopting the AC generation circuit of the embodiment.

Although an example of a configuration of the temperature raising device 40 in a case where the battery 30 mounted in the vehicle 1 has a configuration in which two batteries 30 (here, the battery 30a and the battery 30b) are combined is shown in (a) of FIG. 10, the battery 30 mounted in the vehicle 1 may have a configuration in which three batteries 30 are combined as described above. FIG. 11 is a diagram showing an example of another configuration of the temperature raising device 40 adopting the AC generation circuit 42 of the embodiment. FIG. 11 is an example of a case where the battery 30 mounted in the vehicle 1 has a configuration in which three batteries 30 (a battery 30a, a battery 30b, and a battery 30c) are combined.

As shown in FIG. 11, in the case of a configuration in which the three batteries are combined, an AC generation circuit 42a is connected to the first battery 30a, an AC generation circuit 42b is connected to the second battery 30b, and an AC generation circuit 42c is connected to the third battery 30c. Also, the controller 44 outputs a control signal to a switch provided in each AC generation circuit 42 so that the phase of the AC current generated by each AC generation circuit 42 is shifted by 120°.

In this case, it is only necessary for the control of each AC generation circuit 42 (the output timing of each control signal CS) in the controller 44 to be equivalent to the control of each AC generation circuit 42 (the output timing of each control signal CS) in the controller 44 in a case where the battery 30 has a configuration in which two batteries are combined, as described with reference to FIG. 10. Thereby, the operation (changes in the current and voltage) of each AC generation circuit 42 can be easily understood from the operation (changes in the current and voltage) of each AC generation circuit 42 described with reference to FIG. 10. Accordingly, a detailed description of the control of each AC generation circuit 42 by the controller 44 in the configuration shown in FIG. 11 and the operation of each AC generation circuit 42 is omitted.

As described above, according to the temperature raising device 40 of the embodiment, the AC generation circuit 42 includes, for example, the capacitor C10, the capacitor C11, the capacitor C20, the capacitor C21, the switch S11, the switch S12, the switch S13, the inductor L10, and the inductor L20. In the temperature raising device of the embodiment, by switching the connections of the capacitor C10 and the capacitor C20 provided in the AC generation circuit 42 to the battery 30 to the series connection or the parallel connection, an AC current based on electric power stored in the battery 30 is generated using a resonant operation in which the energy is alternately switched between the magnetic energy stored in the inductance La of the battery 30 and the electrostatic energy stored in at least the capacitor C10. At this time, in the AC generation circuit 42 of the embodiment, values (parameters) of components of the capacitor C10, the capacitor C11, the capacitor C20, the capacitor C21, the inductor L10, and the inductor L20 are adjusted (set) to values calculated on the basis of relational equations including the inductance component Ls of the inductance La provided in the battery 30 (the above Eqs. (12), (29) to (31), (35) and (40)). Thereby, in the temperature raising device 40 of the embodiment, when the capacitor C10 and the capacitor C20 are connected in series with the battery 30 and in parallel to the battery 30 in each AC generation circuit 42, the resonant frequency to of the AC current is equal (matches), and an AC current whose current waveform is closer to a waveform of a sinusoidal wave can be generated. Thereby, in the temperature raising device 40 of the embodiment, the temperature of the battery 30 can be more efficiently raised by an AC current having an electric current waveform close to a waveform of a sinusoidal wave generated by the AC generation circuit 42. Thereby, in the vehicle 1 in which the temperature raising device of the embodiment is adopted, the battery 30 can be used in a state in which the temperature is raised to a suitable temperature and the decrease in the charging/discharging performance of the battery 30 can be suppressed. Furthermore, in the vehicle 1 in which the temperature raising device 40 of the embodiment is adopted, because the harmonic component included in the AC current generated by the AC generation circuit 42 is small, noise emitted when the temperature of the battery 30 is raised can be reduced.

Meanwhile, in the above description, in the temperature raising device 40 of the above-described embodiment, it is assumed that the capacitances Cx of the capacitor C10 and the capacitor C20 provided in the AC generation circuit 42 are equal, the capacitances Cy of the capacitor C11 and the capacitor C21 are equal, and the inductances Lx of the inductor L10 and the inductor L20 are equal. Also, in the above description, it is assumed that the inductance component of the inductance La provided in the battery 30 is an inductance component Ls, and a value (a parameter) of the capacitance or inductance of each component is adjusted (determined) on the basis of a relational equation represented by the above Eqs. (12), the above Eqs. (29) to (31), the above Eqs. (35), and the above Eqs. (40). However, it is assumed that, in relation to the capacitance or inductance of each component, there are also variations in characteristics between the same components. Furthermore, it is assumed that the wiring portion connecting the AC generation circuit 42 and the battery 30 also includes an inductance component. Thus, in the temperature raising device 40 of the embodiment, a value (a parameter) of the capacitance or inductance of each component provided in the AC generation circuit 42 may be a value in consideration of the variations in the characteristics of each component, the variation in the inductance component Ls of the inductance La provided in the battery 30, and the inductance component included in the wiring portion for connecting the AC generation circuit 42 and the battery 30. That is, in the temperature raising device 40 of the embodiment, in the range in which the electric current waveform of the AC current generated by the AC generation circuit 42 can be regarded as a waveform of a sinusoidal wave (a range in which a substantial effect can be obtained), a certain range may be provided for a value of the capacitance Cx of each of the capacitor C10 and the capacitor C20, the capacitance Cy of each of the capacitor C11 and the capacitor C21, or the inductance Lx of each of the inductor L10 and the inductor L20. In other words, in the temperature raising device 40 of the embodiment, it is only necessary to set a value in a range in which it can be said that the capacitances Cx of the capacitors C10 and C20 provided by the AC generation circuit 42 are equal, the capacitances Cy of the capacitors C11 and C21 are equal, and the inductances Lx of the inductors L10 and L20 are equal.

In the temperature raising device 40 of the above-described embodiment, a case where the duty ratio of the control signal CS output to each switch by the controller 44 is 50% has been described. However, as described above, the controller 44 may control the switch by providing a dead time when all switches are in the non-conductive state between the period in which the switch is set in the conductive state and the period in which the switch is set in the non-conductive state. For example, in the temperature raising device 40 of the embodiment, the controller 44 may set a dead time by setting the duty ratio of the control signal CS output to each switch to a value that can be regarded as approximately 50% (for example, a prescribed value between 45% and 55%) and switch the connections of the capacitor C10 and the capacitor C20 to the battery 30 from the parallel connection to the series connection or vice versa by outputting the control signal CS to each switch.

In the temperature raising device 40 according to the above-described embodiment, the AC generation circuit 42 for raising a temperature of the battery 30 by generating an AC current based on electric power stored in the battery 30 having inductance La includes the capacitor C10 having a first end connected to a positive electrode side of the battery 30; the capacitor C20 having a second end connected to a negative electrode side of the battery 30; a parallel switch unit (for example, the switch S11 and the switch S12) configured to connect the capacitor C10 and the capacitor C20 in parallel to the battery 30 by connecting a second end of the capacitor C10 and the second end of the capacitor C20 and connecting the first end of the capacitor C10 and a first end of the capacitor C20; a series switch unit (for example, the switch S13) configured to connect the capacitor C10 and the capacitor C20 in series with the battery by connecting the second end of the capacitor C10 and the first end of the capacitor C20; the inductor L10 connected between the positive electrode side of the battery 30 and the first end of the capacitor C10; the inductor L20 connected between the second end of the capacitor C20 and the negative electrode side of the battery 30; the capacitor C11 connected between the second end of the capacitor C10 and the negative electrode side of the battery 30; and the capacitor C21 connected between the positive electrode side of the battery 30 and the first end of the capacitor C20, whereby the temperature of the battery 30 for traveling mounted in the vehicle 1 can be raised more efficiently. Thereby, in the vehicle 1 in which the temperature raising device 40 of the embodiment is adopted, the battery 30 can be used in a state in which the temperature is raised to a suitable temperature and the decrease in the charging/discharging performance of the battery 30 can be suppressed. Thereby, in the vehicle 1 equipped with the temperature raising device 40 of the embodiment, it is possible to enhance the marketability of the vehicle 1 such as improving durability. From these, the vehicle 1 equipped with the temperature raising device 40 of the embodiment is expected to contribute to improving energy efficiency and reducing adverse effects on the global environment.

In each of the above-described embodiments, a configuration in which the control device 100 controls the activation or stopping of the temperature raising device and the controller 44 controls each switch provided in the AC generation circuit 42 such that the switch is in the conductive state or the non-conductive state has been described. The operation of the controller 44 may be implemented when a hardware processor such as a CPU provided in the controller 44 executes a program. The function of the control device 100 may include the function of the controller 44 described above. In this case, the controller 44 may be omitted in the temperature raising device 40. In this case, the control device 100 is an example of a "controller."

Although modes for carrying out the present invention have been described using embodiments, the present invention is not limited to the embodiments and various modifications and substitutions can also be made without departing from the scope and spirit of the present invention.

What is claimed is:

1. An alternating current (AC) generation circuit for raising a temperature of a power storage by generating an AC current based on electric power stored in the power storage having an inductance component, the AC generation circuit comprising:
   a first capacitor having a first end connected to a positive electrode side of the power storage;
   a second capacitor having a second end connected to a negative electrode side of the power storage;
   a parallel switch unit configured to connect the first capacitor and the second capacitor in parallel to the power storage by connecting a second end of the first capacitor and the second end of the second capacitor and connecting the first end of the first capacitor and a first end of the second capacitor;
   a series switch unit configured to connect the first capacitor and the second capacitor in series with the power storage by connecting the second end of the first capacitor and the first end of the second capacitor;
   a first inductor connected between the positive electrode side of the power storage and the first end of the first capacitor;
   a second inductor connected between the second end of the second capacitor and the negative electrode side of the power storage;
   a third capacitor connected between the second end of the first capacitor and the negative electrode side of the power storage; and a fourth capacitor connected between the positive electrode side of the power storage and the first end of the second capacitor.

2. The AC generation circuit according to claim 1, wherein an inductance of the first inductor, an inductance of the second inductor, a capacitance of the first capacitor, a capacitance of the second capacitor, a capacitance of the third capacitor, and a capacitance of the fourth capacitor are adjusted so that an electric current waveform of the AC current is close to a waveform of a sinusoidal wave on a basis of a relational equation including the inductance component.

3. The AC generation circuit according to claim 2, wherein the relational equation is used to adjust the inductance of the first inductor, the inductance of the second inductor, the capacitance of the first capacitor, the capacitance of the second capacitor, the capacitance of the third capacitor, and the capacitance of the fourth capacitor so that a frequency of the AC current in a parallel state in which the first capacitor and the second capacitor are connected in parallel to the power storage matches a frequency of the AC current in a series state in which the first capacitor and the second capacitor are connected in series with the power storage.

4. The AC generation circuit according to claim 3, wherein the inductance of the first inductor is the same as the inductance of the second inductor.

5. The AC generation circuit according to claim 4, wherein the capacitance of the first capacitor and the capacitance of the second capacitor are the same.

6. The AC generation circuit according to claim 5, wherein the capacitance of the third capacitor and the capacitance of the fourth capacitor are the same as a second capacitance.

7. The AC generation circuit according to claim 1, wherein the inductance component includes an inductance component provided in a wiring portion between the power storage and the AC generation circuit.

8. The AC generation circuit according to claim 1, wherein the parallel switch unit includes
   a first switch having a first terminal connected to the second end of the first capacitor and a second terminal connected to the second end of the second capacitor; and
   a second switch having a first terminal connected to the first end of the first capacitor and a second terminal connected to the first end of the second capacitor,
   wherein the series switch unit includes a third switch having a first terminal connected to the first end of the second capacitor and a second terminal connected to the second end of the first capacitor,
   wherein the first switch and the second switch are controlled so that the first switch and the second switch are in a conductive state or a non-conductive state at the same time according to a first control signal,
   wherein the third switch is controlled so that the third switch is in the conductive state or the non-conductive state according to a second control signal, and
   wherein a period of a first state in which the first switch and the second switch are in the conductive state according to the first control signal does not overlap a period of a second state in which the third switch is in the conductive state according to the second control signal.

9. The AC generation circuit according to claim 8, wherein the power storage includes a first power storage and a second power storage connected in series with the first power storage, wherein the AC generation circuit is connected to the first power storage, wherein a second AC generation circuit having the same configuration as the AC generation circuit is connected to the second power storage, and wherein the first control signal and the second control signal are input so that a prescribed phase difference is given between an AC current generated by the AC generation circuit and a second AC current that is an AC current generated by the second AC generation circuit.

10. A temperature raising device comprising:

the AC generation circuit according to claim 9; and a controller configured to output the first control signal and the second control signal and alternately switch a state between a parallel state in which the first capacitor and the second capacitor are connected in parallel to the power storage by setting the first switch and the second switch in the conductive state and setting the third switch in the non-conductive state and a series state in which the first capacitor and the second capacitor are connected in series with the power storage by setting the first switch and the second switch in the non-conductive state and setting the third switch in the conductive state according to the first control signal and the second control signal.

\*    \*    \*    \*    \*